(12) United States Patent
Haruyama et al.

(10) Patent No.: US 7,659,955 B2
(45) Date of Patent: Feb. 9, 2010

(54) LIQUID CRYSTAL DEVICE AND PROJECTION DISPLAY DEVICE WITH OPTICAL-AXIS-ADJUSTING UNIT FOR OPTICAL COMPENSATOR

(75) Inventors: Akihide Haruyama, Nagano (JP); Joji Nishimura, Nagano (JP)

(73) Assignee: Epson Imaging Devices Corporation, Tokyo (JP)

( * ) Notice: Subject to any disclaimer, the term of this patent is extended or adjusted under 35 U.S.C. 154(b) by 305 days.

(21) Appl. No.: 11/609,419

(22) Filed: Dec. 12, 2006

(65) Prior Publication Data

US 2007/0132926 A1   Jun. 14, 2007

(30) Foreign Application Priority Data

Dec. 13, 2005   (JP) .............................. 2005-358553

(51) Int. Cl.
*G02F 1/1335* (2006.01)
(52) U.S. Cl. ...................................... 349/121; 349/117
(58) Field of Classification Search .......... 349/117–121
See application file for complete search history.

(56) References Cited

U.S. PATENT DOCUMENTS

| | | | | |
|---|---|---|---|---|
| 6,556,266 | B1* | 4/2003 | Shirochi et al. | 349/118 |
| 2004/0075796 | A1* | 4/2004 | Nair et al. | 349/117 |
| 2006/0028601 | A1* | 2/2006 | Kawahara et al. | 349/117 |

FOREIGN PATENT DOCUMENTS

| | | |
|---|---|---|
| JP | 2000-078444 A | 3/2000 |
| JP | 2001-356346 | 12/2001 |
| JP | 2002-014345 | 1/2002 |
| JP | 2002-217427 | 8/2002 |

* cited by examiner

*Primary Examiner*—Michael H Caley
(74) *Attorney, Agent, or Firm*—Lowe Hauptman Ham & Berner LLP

(57) ABSTRACT

A liquid crystal device includes an OCB mode liquid crystal panel including a pair of substrates and a liquid crystal layer disposed therebetween, an optical compensator provided on at least one side of the liquid crystal panel, and an optical-axis-adjusting unit that moves the optical compensator relative to the liquid crystal panel to adjust an angle formed by an optical axis of the optical compensator and an optical axis of the liquid crystal panel.

6 Claims, 13 Drawing Sheets

LIQUID CRYSTAL DEVICE AND PROJECTION DISPLAY DEVICE WITH OPTICAL-AXIS-ADJUSTING UNIT FOR OPTICAL COMPENSATOR

BACKGROUND

1. Technical Field

The present invention relates to a liquid crystal device and a projection display device.

2. Related Art

In a liquid crystal projector (projection display device), illuminating light is modulated by a liquid crystal device provided as a light valve, and the modulated light is projected onto a screen to display an image. In such a projector including a liquid crystal device as a light valve, when image light includes light passing through a liquid crystal layer in an oblique direction, the black level is increased to decrease the contrast. In order to solve this problem, for example, JP-A-2002-217427 and JP-A-2002-14345 propose a technique in which an optical compensation element used in a direct-viewing-type liquid crystal display device is combined with a light valve.

Recently, in order to improve the image quality of moving images, optically compensated bend (OCB) mode liquid crystal devices whose response time is short have attracted attentions. Accordingly, the present inventors studied a projector in which an OCB mode liquid crystal device was used as a light valve. As a result, in the OCB mode liquid crystal light valve, light passing through a liquid crystal layer in an oblique direction causes a decrease in contrast. Furthermore, even when the above-described optical compensation element is disposed on the side of the outer surface of the liquid crystal device, the decrease in contrast could not be satisfactorily prevented.

SUMMARY

An advantage of some aspects of the invention is that it provides an OCB mode liquid crystal device that can achieve a high-contrast display and that is suitable for use in a light valve of a projection display device. Another advantage of some aspects of the invention is that it provides a projection display device that can achieve a high-contrast display.

A liquid crystal device according to an aspect of the invention includes an OCB mode liquid crystal panel including a pair of substrates and a liquid crystal layer disposed therebetween, an optical compensator provided on at least one side of the liquid crystal panel, and an optical-axis-adjusting unit that moves the optical compensator relative to the liquid crystal panel to adjust an angle formed by an optical axis of the optical compensator and an optical axis of the liquid crystal panel. According to this structure, the optical compensator can be moved relative to the liquid crystal panel by the optical-axis-adjusting unit. Accordingly, the substantial phase retardation of the optical compensator can be changed to optimize the optical compensation condition. When the optical axis of the liquid crystal panel is shifted from the optical axis of the optical compensator because of variations in the production etc. or when the pretilt angle of liquid crystals in the liquid crystal panel is changed, the optical compensation condition can be easily corrected to achieve a high contrast display.

In the liquid crystal device, the optical-axis-adjusting unit may include a moving mechanism that moves the optical compensator so as to become slanted with respect to the surface of a substrate of the liquid crystal panel. This structure can easily change the substantial phase retardation of the optical compensator for light incident on the liquid crystal panel or the light emitted from the liquid crystal panel. Thus, the optical compensation condition can be easily optimized.

In the liquid crystal device, the optical-axis-adjusting unit may include a moving mechanism that moves the optical compensator around the normal line of a substrate of the liquid crystal panel. When the optical-axis-adjusting unit includes a moving mechanism that can change an angle formed by the normal line of the substrate of the liquid crystal panel and the normal line of the optical compensator, the following advantages can be provided. For example, when the rubbing direction of an alignment layer of the liquid crystal panel is shifted from a designed direction because of variations in the production etc., the optical axes can be aligned by turning the optical compensator by the optical-axis-adjusting unit without changing the optical compensator, thereby achieving a high-contrast display. When the pretilt angle of liquid crystals is changed, an appropriate optical compensation condition can be obtained without changing the optical compensator as in the above case.

In the liquid crystal device, the optical compensator may include an optical anisotropic layer composed of an optical medium having positive or negative refractive index anisotropy. In the liquid crystal device, the optical compensator may include an optical anisotropic layer that exhibits either an optically uniaxial property or an optically biaxial property. In the liquid crystal device, the optical compensator may include an optical anisotropic layer in which the optical medium has a hybrid alignment. In the liquid crystal device, the optical compensator may include an optical anisotropic layer that is composed of an optical medium having negative refractive index anisotropy and that exhibits an optically uniaxial property, and the optical anisotropic layer may have an optical axis that is tilted by a certain angle with respect to the direction of the normal line of the optical compensator. In all structures including any one of the above optical compensators, the optical compensation condition of the liquid crystal device can be easily optimized using the optical-axis-adjusting unit.

In the liquid crystal device, both the optical compensator and the optical-axis-adjusting unit may be provided at both sides of the liquid crystal panel. According to this structure, the optical compensation condition for light incident on the liquid crystal panel and the light emitted from the liquid crystal panel can be optimized. In the liquid crystal device, a plurality of sets of the optical compensator and the optical-axis-adjusting unit for supporting the optical compensator may be provided at one side of the liquid crystal panel. According to this structure, for example, when a plurality of sets of the optical compensator and the optical-axis-adjusting unit are provided on the light-emitting side, degradation of the optical compensators due to illuminating light supplied from a light source can be prevented.

In the liquid crystal device, a plurality of the optical compensators may be provided, and each of the optical-axis-adjusting units may include a moving mechanism that moves the plurality of optical compensators together or separately. According to this structure, the optical compensation condition can be adjusted more accurately, and the maximum contrast of the liquid crystal device can be easily obtained.

In the liquid crystal device, the plurality of optical compensators may be an optical compensator including an optical anisotropic layer having an optically biaxial property and an optical compensator including an optical anisotropic layer having negative refractive index anisotropy and an optically uniaxial property. In this structure, the optical compensation condition of the liquid crystal device can be easily optimized using the optical-axis-adjusting unit.

In the liquid crystal device, the liquid crystal panel may be a reflective liquid crystal panel, and the operation mode of the liquid crystal device may be a reflective optically compensated bend (R-OCB) mode. That is, the liquid crystal device according to an aspect of the invention can also be suitable for use in a liquid crystal device including a reflective liquid crystal panel such as a liquid crystal on silicon (LCOS).

A projection display device according to an aspect of the invention includes the above liquid crystal device according to an aspect of the invention. This structure can provide a projection display device that easily achieves a high-contrast display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
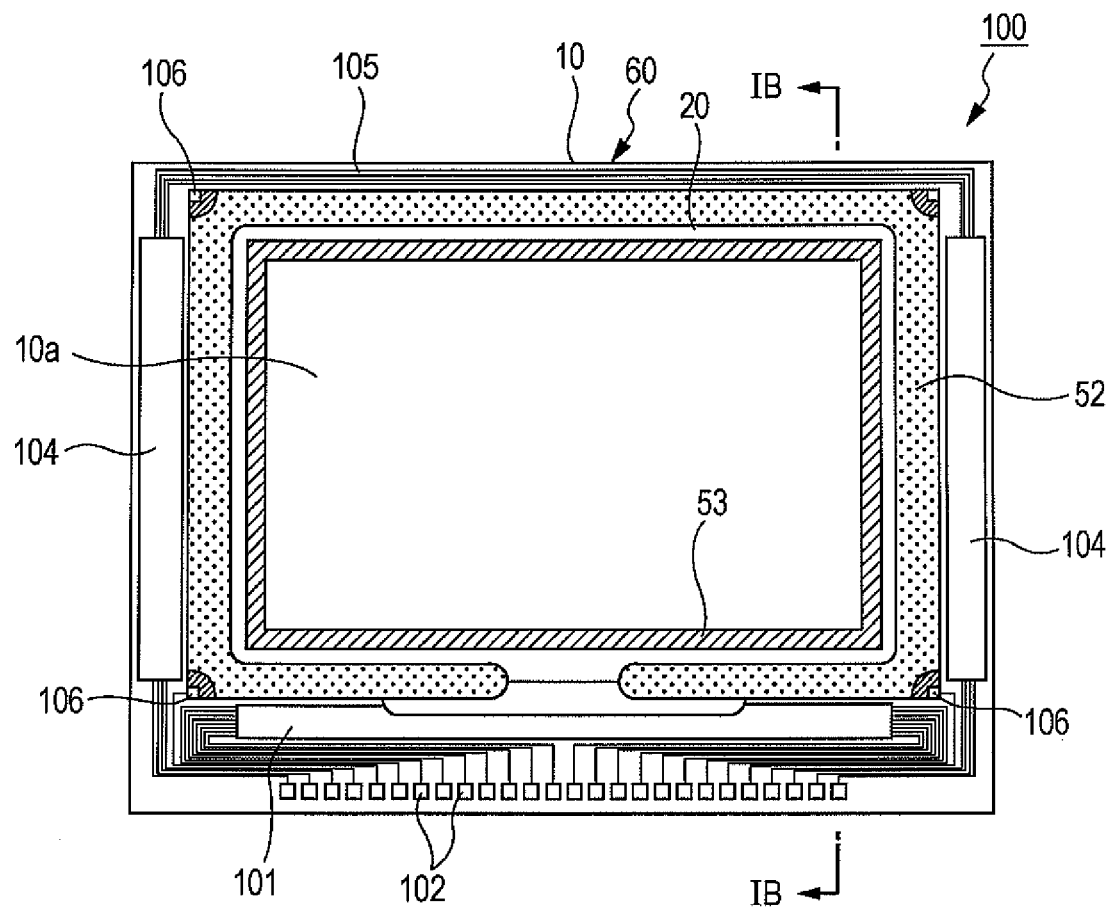
FIGS. 1A and 1B are view showing the overall structure of a liquid crystal device according to a first embodiment of the invention.

Embodiments of the invention will now be described with reference to the drawings. In the drawings used for the description below, the reduction scale of each component is changed, as needed, so that each component has a size that can be recognized in the drawings. For the purpose of this description, the side adjacent to a liquid crystal layer in each component constituting a liquid crystal device is referred to as "inside", and the opposite side is referred to as "outside".

First Embodiment

A liquid crystal device according to a first embodiment of the invention will now be described with reference to FIGS. 1 to 6. In this embodiment, a description will be made of an example of an active matrix transmissive liquid crystal panel in which thin film transistors (hereinafter referred to as TFTs) are used as switching elements. In the drawings used for the description below, the reduction scales of each layer and each component are different, so that each layer and each component have a size that can be recognized in the drawings.

Overall Structure

Figure 1B:
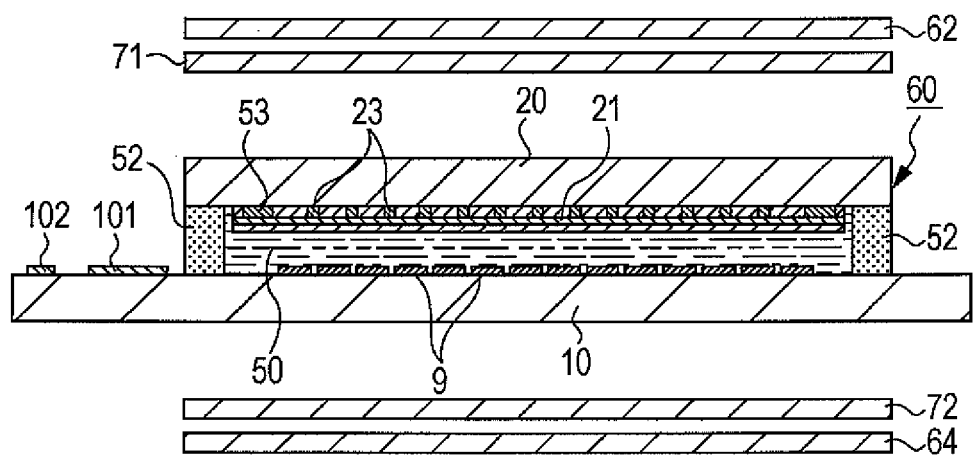

FIG. 1A is a plan view of a liquid crystal device of this embodiment, viewed from the side of a counter substrate together with constituent elements, and FIG. 1B is a cross-sectional view taken along line IB-IB in FIG. 1A. As shown in FIGS. 1A and 1B, a liquid crystal device 100 of this embodiment includes a liquid crystal panel 60, optical compensators 71 and 72 disposed so as to sandwich the liquid crystal panel 60, and polarizers 62 and 64 disposed at the outside of the optical compensators 71 and 72, respectively. In the liquid crystal panel 60, a TFT array substrate 10 and a counter substrate 20 are bonded with a sealing component 52 provided therebetween, and a liquid crystal layer 50 is included in an area formed by the sealing component 52. The liquid crystal layer 50 includes liquid crystals having positive dielectric anisotropy, and forms the splay alignment in the initial condition and the bend alignment during display operation, which will be described below. A light-shielding film (peripheral partition) 53 composed of a light-shielding material is provided in an area inside the sealing component 52. In the peripheral circuit area outside the sealing component 52, a data line-driving circuit 101 and external circuit-mounting terminals 102 are provided along a side of the TFT array substrate 10. Scanning line-driving circuits 104 are provided along two sides adjacent to the above side of the TFT array substrate 10. A plurality of wirings 105 for connecting the scanning line-driving circuits 104, which are provided at both sides of an image display area, to each other are provided at the remaining side of the TFT array substrate 10. Inter-substrate conductive materials 106 for electrically connecting the TFT array substrate 10 to the counter substrate 20 are provided at the corners of the counter substrate 20. As shown in FIG. 1B, pixel electrodes 9 are provided inside the TFT array substrate 10. A light-shielding film 23 that partitions the pixel electrodes 9 and that extends in a grid shape, and a common electrode 21 are provided inside the counter substrate 20 facing the TFT array substrate 10.

Figure 2:
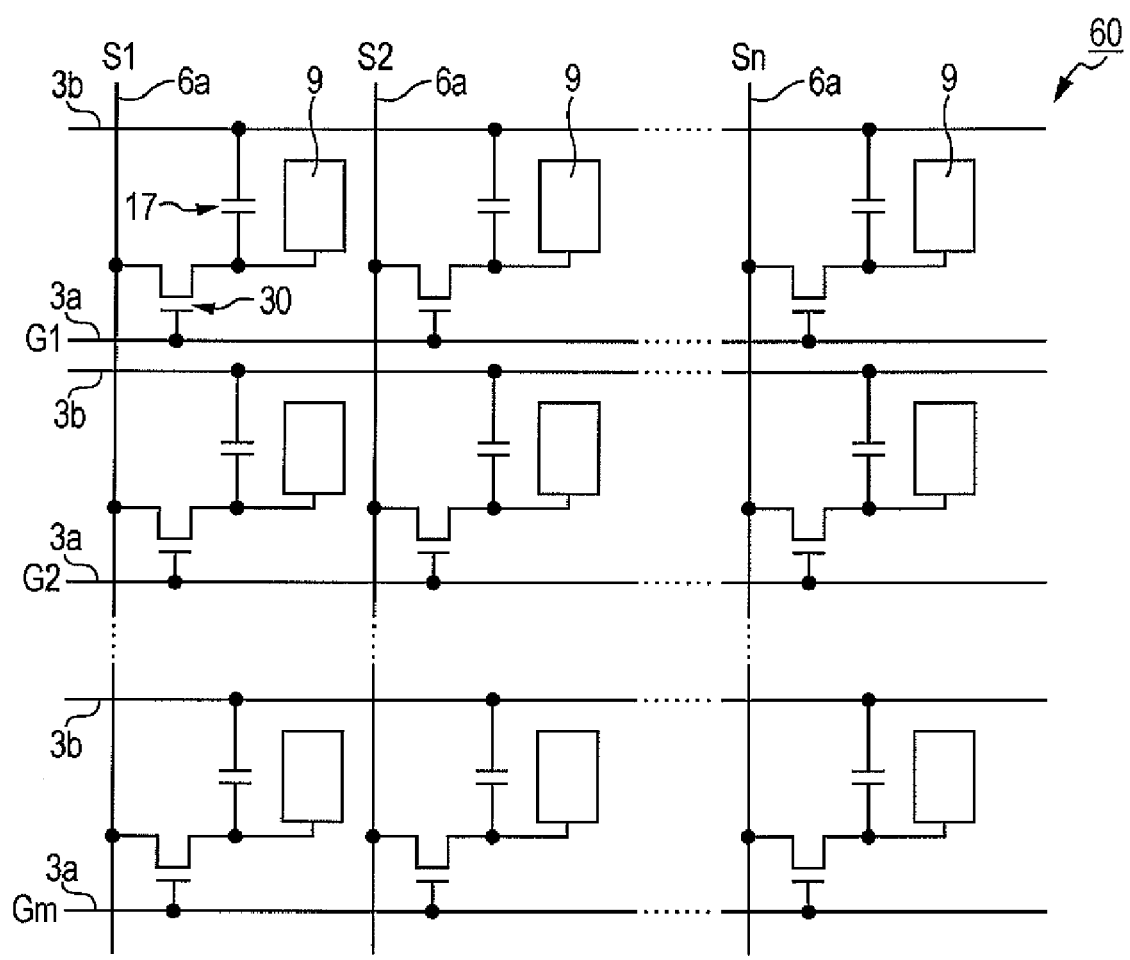
FIG. 2 is an equivalent circuit diagram of the liquid crystal panel.

FIG. 2 is an equivalent circuit diagram of the liquid crystal panel 60. A pixel electrode 9 and a TFT 30, which is a switching element for controlling electric conduction to the pixel electrode 9, are provided at each of the pixels that are arrayed in the form of a matrix to constitute the image display area of the transmissive liquid crystal panel. A data line 6a is electrically connected to the source of the TFT 30. Image signals S1, S2, ..., and Sn are supplied to each data line 6a. The image signals S1, S2, ..., and Sn may be supplied to each data line 6a in a line-sequential manner in that order. Alternatively, the image signals S1, S2, ..., and Sn may be supplied to each group including a plurality of adjacent data lines 6a. A scanning line 3a is electrically connected to the gate of the TFT 30. Scanning signals G1, G2, . . . , and Gm are supplied to each scanning line 3a at a predetermined timing in a pulse manner. The scanning signals G1, G2, . . . , and Gm are applied to each scanning line 3a in a line-sequential manner in that order. The drain of the TFT 30 is electrically connected to the corresponding pixel electrode 9. When the TFT 30, which is a switching element, turns to the on state for a certain period on the basis of the scanning signals G1, G2, . . . , and Gm supplied from the scanning line 3a, the image signals S1, S2, . . . , and Sn supplied from the data line 6a are written in the liquid crystals of each pixel at a predetermined timing.

The image signals S1, S2, . . . , and Sn written in the liquid crystals at a predetermined level are maintained for a certain period in a liquid crystal capacitor formed between the pixel electrode 9 and the common electrode described below. In order to prevent the maintained image signals S1, S2, . . . , and Sn from leaking, a storage capacitor 17 is provided between the pixel electrode 9 and a capacitor line 3b and disposed in parallel with the liquid crystal capacitor. Thus, when a voltage signal is applied to the liquid crystals, the alignment state of the liquid crystal molecules is changed in accordance with the applied voltage level. Accordingly, light incident on the liquid crystals is modulated to enable a gradation display.

Liquid Crystal Panel

Figure 3:
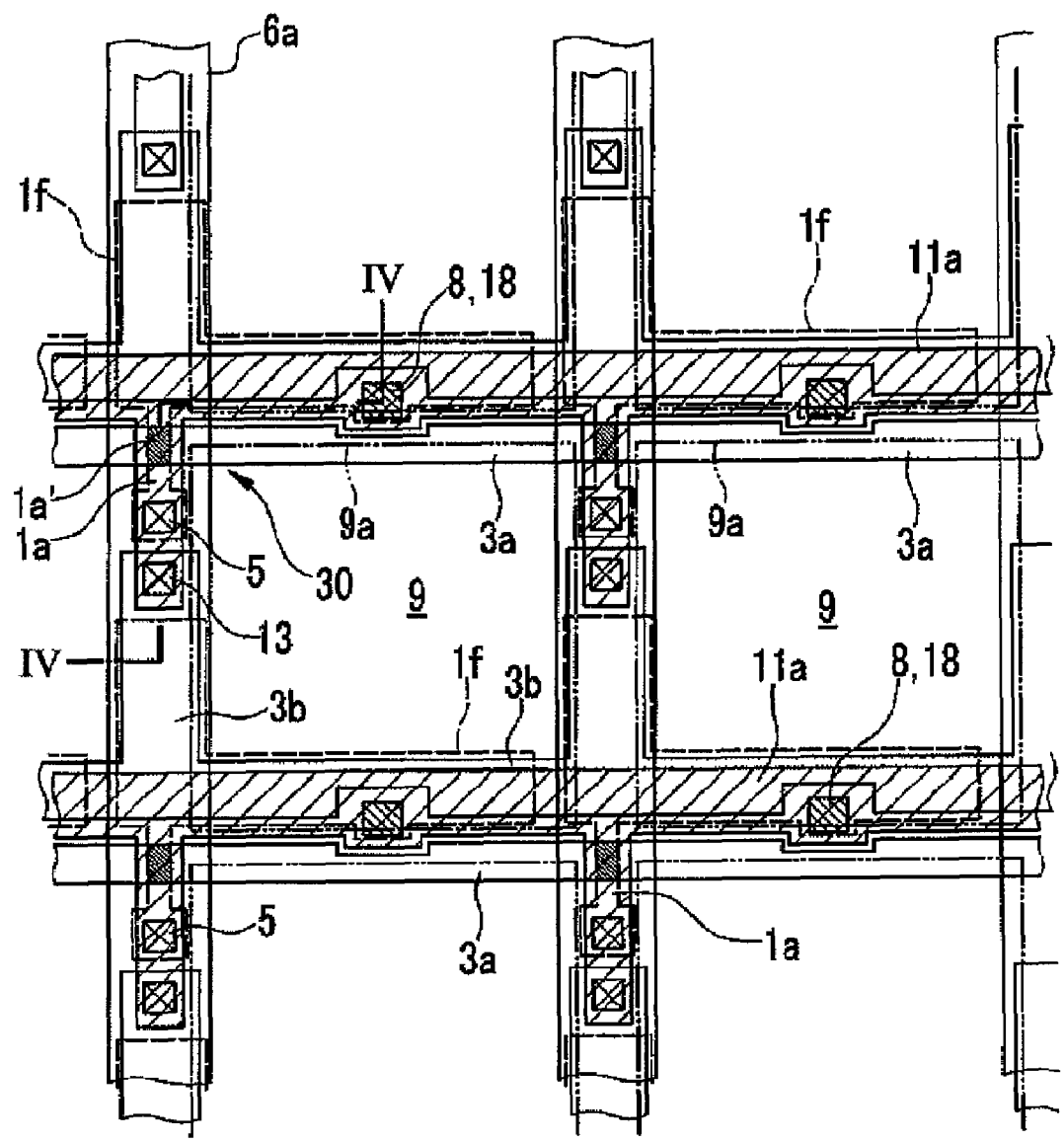
FIG. 3 is a plan view showing the structure of a TFT array substrate constituting the liquid crystal panel.

FIG. 3 is a plan view showing the structure of the TFT array substrate 10 constituting the liquid crystal panel 60. In the liquid crystal panel 60 of this embodiment, rectangular pixel electrodes 9 (whose outlines are shown by the two-dot chain line 9a in FIG. 3) composed of a transparent conductive material such as indium tin oxide (ITO) are arrayed on the TFT array substrate 10 in the form of a matrix. Data lines 6a, scanning lines 3a, and capacitor lines 3b are provided along the vertical and horizontal boundaries of the pixel electrodes 9. In this embodiment, areas where the pixel electrodes 9 are provided are pixels, and a display operation is performed in each pixel arrayed in the form of a matrix.

The TFT 30 includes a semiconductor layer 1a composed of a polysilicon film or the like. A data line 6a is electrically connected to the source region of the semiconductor layer 1a via a contact hole 5. A pixel electrode 9 is electrically connected to the drain region of the semiconductor layer 1a via a contact hole 8 (18). A channel region 1a' is provided at a part of the semiconductor layer 1a, the part facing a scanning line 3a. Accordingly, the scanning line 3a functions as a gate electrode of the TFT 30 at the part facing the channel region 1a'.

A capacitor line 3b includes a main line portion that extends substantially linearly along the scanning line 3a (i.e., a first region provided along the scanning line 3a in the plan view) and a protruding portion protruding from the intersection with the data line 6a to the upstream side (upward direction in the figure) along the data line 6a (i.e., a second region extending along the data line 6a in the plan view). A first light-shielding film 11a is provided in the area shown by the oblique lines rising rightward in FIG. 3. The protruding portion of the capacitor line 3b is electrically connected to the first light-shielding film 11a via a contact hole 13 to form an electrode of a storage capacitor described below.

Figure 4:
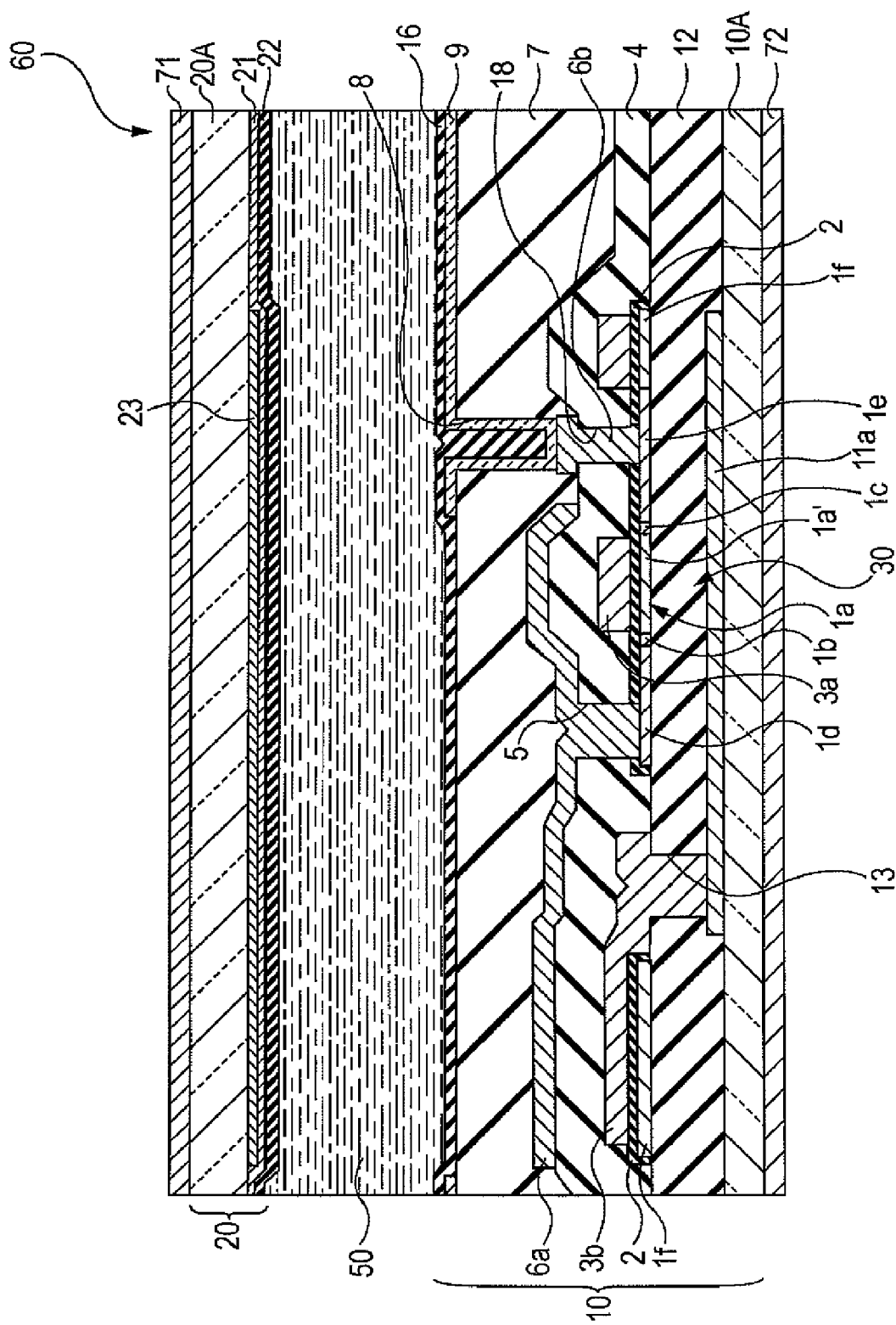
FIG. 4 is a cross-sectional view taken along line IV-IV in FIG. 3.

FIG. 4 is a cross-sectional view showing the structure of the liquid crystal panel 60, that is, a partial cross-sectional view taken along line IV-IV in FIG. 3. The TFT array substrate 10 includes a substrate 10A composed of a light-transmissive material such as glass or quartz; and a TFT 30, a pixel electrode 9, an alignment layer 16 that are provided inside the substrate 10A (at the side of the liquid crystal layer 50). The counter substrate 20 includes a substrate 20A composed of a light-transmissive material such as glass or quartz; and a common electrode 21 and an alignment layer 22 that are provided inside the substrate 20A.

The first light-shielding film 11a is partly provided on the substrate 10A, which is a base substance of the TFT array substrate 10. A first interlayer insulating film 12 is provided so as to cover the first light-shielding film 11a. The semiconductor layer 1a is patterned on the first interlayer insulating film 12. A gate insulating film 2 is provided on the surface of the semiconductor layer 1a, and the scanning line 3a is provided so as to face a part of the semiconductor layer 1a with the gate insulating film 2 therebetween. The channel region 1a' is provided at a part of the semiconductor layer 1a facing the scanning line 3a. The source region and the drain region are provided at both sides of the channel region 1a'. The TFT 30 has a lightly doped drain (LDD) structure. Each of the source region and the drain region includes a high-concentration region having a relatively high impurity concentration and a low-concentration region (LDD region) having a relatively low impurity concentration. More specifically, the source region includes a low-concentration source region 1b and a high-concentration source region 1d. The drain region includes a low-concentration drain region 1c and a high-concentration drain region 1e.

A second interlayer insulating film 4 is provided so as to cover the gate insulating film 2 and the scanning line 3a. The data line 6a and a relay electrode 6b are provided on the second interlayer insulating film 4. The data line 6a is electrically connected to the high-concentration source region 1d via a contact hole 5 penetrating through the second interlayer insulating film 4 and reaching the semiconductor layer 1a. The relay electrode 6b is electrically connected to the high-concentration drain region 1e via a contact hole 18 penetrating through the second interlayer insulating film 4 and reaching the semiconductor layer 1a. Furthermore, a third interlayer insulating film 7 is provided so as to cover the data line 6a and the relay electrode 6b. The pixel electrode 9 is provided on the surface of the third interlayer insulating film 7. The pixel electrode 9 is electrically connected to the relay electrode 6b via a contact hole 8 penetrating through the third interlayer insulating film 7 and reaching the relay electrode 6b. Accordingly, the pixel electrode 9 is electrically connected to the high-concentration drain region 1e. Furthermore, the alignment layer 16 composed of an organic substance such as a polyimide or an inorganic substance such as silicon oxide is provided so as to cover the pixel electrode 9.

In this embodiment, as shown in FIG. 3, a first storage capacitor electrode 1f that extends from the semiconductor layer 1a and that substantially has an L-shape in plan view is provided along a corner formed by two adjacent sides of the pixel electrode 9. As shown in FIG. 4, a dielectric film extending from the gate insulating film 2 is provided on the surface of the first storage capacitor electrode 1f. In the capacitor line 3b provided on the dielectric film (gate insulating film 2), a part of the capacitor line 3b facing the first storage capacitor electrode 1f with the dielectric film therebetween, forms a second storage capacitor electrode. The second storage capacitor electrode forms the storage capacitor 17 together with the first storage capacitor electrode 1f.

The first light-shielding film 11a provided on the substrate 10A of the TFT 30 prevents light leakage caused by a phenomenon in which light incident on the liquid crystal panel 60 enters the channel region 1a', the low-concentration source region 1b, and the low-concentration drain region 1c of the semiconductor layer 1a. In addition, the first light-shielding film 11a is electrically connected to an upstream or downstream capacitor line 3b via the contact hole 13 penetrating through the first interlayer insulating film 12. Accordingly, the first light-shielding film 11a functions as a third storage capacitor electrode of the storage capacitor 17. The third storage capacitor electrode and the first storage capacitor electrode 1f form a capacitor in which the first interlayer insulating film 12 serves as a dielectric film.

A second light-shielding film 23 is provided on the surface of the substrate 20A at an area corresponding to an area where the data line 6a, the scanning line 3a, and the TFT 30 are formed. The common electrode 21 composed of a transparent conductive material such as ITO is provided on the substantially entire surface of the substrate 20A so as to cover the second light-shielding film 23. The alignment layer 22 composed of an organic substance such as a polyimide or an inorganic substance such as silicon oxide is provided on the surface of the common electrode 21. The alignment layer 22 and the alignment layer 16 align liquid crystal molecules substantially in a direction parallel to the plane of the substrates when no voltage is applied.

The liquid crystal layer 50 disposed between the TFT array substrate 10 and the counter substrate 20 is an OCB mode liquid crystal layer that has the bend alignment during display operation. When no voltage is applied between the pixel electrode 9 and the common electrode 21, the liquid crystal layer is in the splay alignment state. By applying a predetermined voltage to the pixel electrode 9 in the initial operation of the liquid crystal panel 60, the liquid crystal layer 50 is transferred to the bend alignment state. The image display is performed while the bend alignment is maintained. In the liquid crystal device 100, illuminating light incident from the lower side of the polarizer 62 is polarized by the polarizer 62 to linearly polarized light in the Y-axis direction parallel to the transmission axis thereof, and is incident on the optical compensator 71. The light transmitted through the optical compensator 71 is then incident on the liquid crystal panel 60. A phase retardation corresponding to the alignment state is provided to the light by the liquid crystal layer 50 of the liquid crystal panel 60, and the light is incident on the optical compensator 72 from the liquid crystal panel 60. The light transmitted through the optical compensator 72 is incident on the polarizer 64. The amount of light transmitting through the polarizer 64 is determined in accordance with the polarized state of the incident light, thus performing a gradation display.

Polarizers and Optical Compensators

Figure 5:
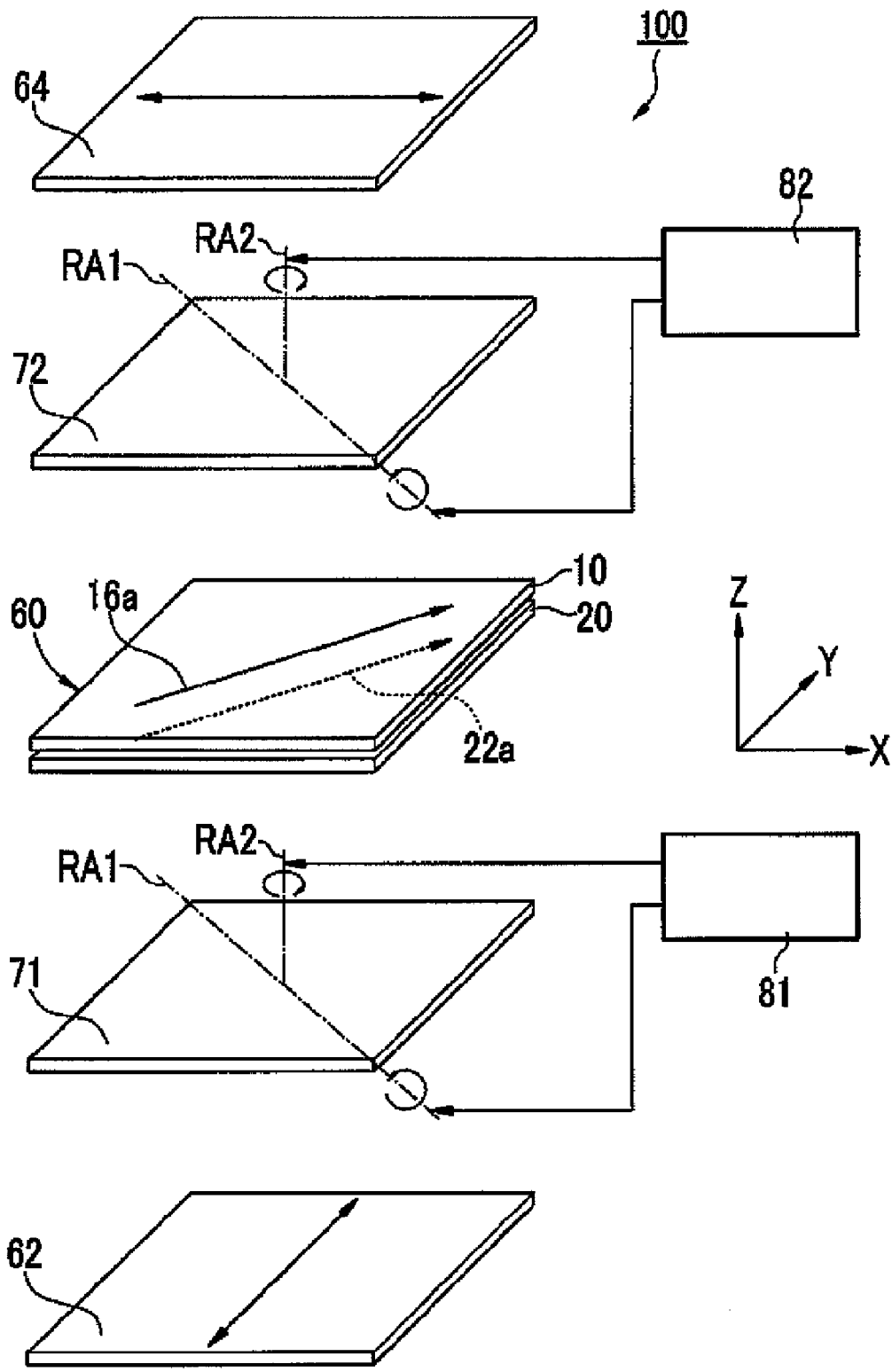
FIG. 5 is an exploded perspective view of the liquid crystal device according to the first embodiment of the invention.

FIG. 5 is an exploded perspective view of the liquid crystal device according to this embodiment. The liquid crystal device 100 of this embodiment includes the above-described liquid crystal panel 60, the optical compensator 72 disposed outside the TFT array substrate 10 of the liquid crystal panel 60, the optical compensator 71 disposed outside of the counter substrate 20, and the polarizers 62 and 64 disposed outside the optical compensators 71 and 72, respectively. Optical-axis-adjusting units 81 and 82 are connected to the optical compensators 71 and 72, respectively. Each of the optical-axis-adjusting units 81 and 82 includes a rotation mechanism (moving mechanism, not shown in the figure) that can turn the optical compensator 71 or 72 connected to the optical-axis-adjusting unit 81 or 82, respectively, around the rotation axes RA1 and RA2. Accordingly, the installation angle of the optical compensator 71 or 72 with respect to the liquid crystal panel 60 can be freely adjusted. In the liquid crystal device 100 of this embodiment, the side at which the polarizer 62 is disposed (the lower side of the figure) is the light-incident side, and the side at which the polarizer 64 is disposed (the upper side of the figure) is the light-emitting side. Although not shown in the figure, in an alternative structure of the liquid crystal device 100 of this embodiment, the side at which the polarizer 62 is disposed may be the light-emitting side, and the side at which the polarizer 64 is disposed may be the light-incident side.

The polarizer 62 provided at the light-incident side is disposed so that the polarization axis thereof is parallel to the Y-axis direction. The polarizer 64 provided at the light-emitting side is disposed so that the polarization axis thereof is parallel to the X-axis direction. The directions of the polarization axes of these polarizers 62 and 64 are shifted by about 45° with respect to rubbing directions 16a and 22a of the alignment layers 16 and 22, respectively, of the liquid crystal panel 60 in plan view. The rubbing directions 16a and 22a are parallel with each other.

Figure 6:
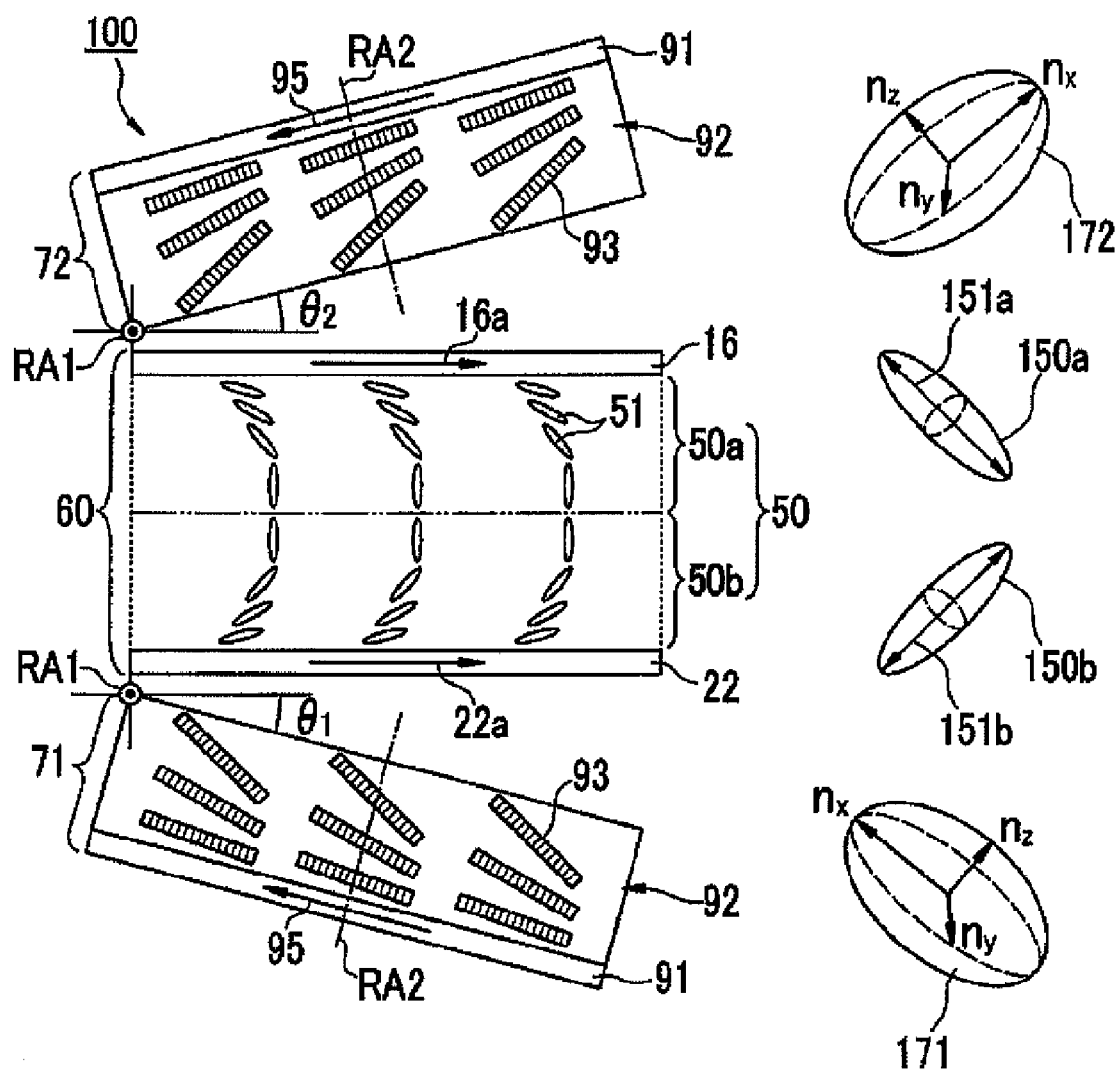
FIG. 6 is a schematic view illustrating the operation of optical compensation according to the first embodiment of the invention.

FIG. 6 is a schematic view illustrating the operation of optical compensation in the liquid crystal device 100. Among constituent elements of the liquid crystal device 100, only those whose description is necessary are selected and shown in FIG. 6. More specifically, the optical compensators 71 and 72, the alignment layers 16 and 22 of the liquid crystal panel 60, and the liquid crystal layer 50 are shown in the figure. Average index ellipsoids 171 and 172 of the optical compensators 71 and 72 are shown on the right side of the optical compensator 71 and 72, respectively, in the figure. An average index ellipsoid 150a of a half liquid crystal layer 50a of the liquid crystal layer 50 disposed at the side of the alignment layer 16 (the side of the TFT array substrate 10) and an average index ellipsoid 150b of another half liquid crystal layer 50b disposed at the side of the alignment layer 22 (the side of the counter substrate 20) are shown on the right side of the liquid crystal layer 50 in the figure.

The optical compensators 71 and 72 of this embodiment are composed of an optical anisotropic substance, such as a discotic compound, having negative refractive index anisotropy, and the principal refractive indices nx, ny, and nz of the optical anisotropic substance satisfy a relationship nx=ny>nz. Since the optical compensators 71 and 72 have a structure of the hybrid alignment in which the optical axis angle of the discotic compound is changed in the film thickness direction, the direction of the principal refractive index nz of the average index ellipsoid is tilted by a certain angle with respect to the normal line of the substrate. In this embodiment, the z direction of the index ellipsoids 171 and 172 is tilted by a certain angle with respect to a direction of the normal line of the substrate of the optical compensators 71 and 72, respectively. The refractive index nz in the z direction is smaller than the refractive indices in the other directions, and the index ellipsoid substantially has a disc shape. In this embodiment, the in-plane phase retardation ((nx−nz)×d; wherein d represents the thickness of the optical compensator) of the optical compensators 71 and 72 is 26 nm, and the retardation of the liquid crystal panel 60 is 0.66 μm (in the state of splay alignment).

The liquid crystal layer 50 included in the liquid crystal panel 60 exhibits an optically positive uniaxial property, and the refractive index in the director direction of liquid crystal molecules 51 is larger than the refractive indices in the other directions. In the liquid crystal layer 50 of this embodiment that has the bend alignment during display operation, the upper half of the liquid crystal layer 50 (the part disposed between the halfway position of the layer thickness and the alignment layer 16) and the lower half of the liquid crystal layer 50 (the part disposed between the halfway position of the layer thickness and the alignment layer 22) include rugby ball-shaped index ellipsoids 150a and 150b, respectively, as shown on the right side of FIG. 6. Since the liquid crystal molecules disposed near the interface cannot completely stand vertically with respect to the pair of substrates during black display, residual retardation occurs. This residual retardation must be cancelled out. Furthermore, such a rugby ball-shaped index ellipsoid becomes an ellipse when viewed from an oblique direction, and the difference between the major axis and the minor axis of the ellipse causes birefringence. The phase retardation in the case where these index ellipsoids are viewed from an oblique direction causes light leakage during black display, resulting in a decrease in the contrast ratio of the liquid crystal panel.

In contrast, as described above, a discotic liquid crystal 93 constituting the optical compensators 71 and 72 exhibits an optically negative uniaxial property. Therefore, when the optical axes in the z direction of the disc-shaped index ellipsoids 171 and 172 in the optical compensators 71 and 72 are disposed so as to be parallel with corresponding optical axes 151b and 151a of the rugby ball-shaped index ellipsoids 150b and 150a disposed adjacent to the disc-shaped index ellipsoids 171 and 172, respectively, the optical plus and minus become opposite each other and the birefringence effect in the liquid crystal panel 60 can be cancelled out. Accordingly, the optical compensators 71 and 72 are disposed so that alignment control directions 95 of alignment layers in the optical compensators 71 and 72 are substantially the same as alignment control directions (rubbing directions 16a and 22a) of the alignment layers in the liquid crystal panel 60. Furthermore, as shown in FIG. 6, the optical compensators 71 and 72 are disposed so that among the molecules of the discotic liquid crystal 93 in the optical compensators 71 and 72, those with the largest tilt angle face the liquid crystal panel 60. Consequently, this structure can three-dimensionally compensate for the optical phase retardation generated in an area at the light-incident side of the liquid crystal panel 60.

More specifically, in the optical compensators 71 and 72, an alignment layer (not shown) is provided on a support 91 composed of triacetyl cellulose (TAC) or the like, and a discotic compound layer 92 composed of a triphenylene derivative or the like is provided on the alignment layer. The alignment layer is composed of, for example, polyvinyl alcohol (PVA). A rubbing treatment or the like is performed on the surface of the alignment layer to control the alignment direction of liquid crystal molecules. The discotic compound layer 92 is an optical anisotropic layer having an optical structure in which the tilt angle of the optical axis (axis in the direction of the normal line of the disc surface) of the discotic liquid crystal (discotic compound) 93, which is an optical medium that exhibits a negative uniaxial property, is continuously changed in the thickness direction. Such a hybrid alignment structure can be obtained by applying the liquid crystalline discotic liquid crystal 93, which is the uniaxial optical medium, on the support 91, heating the support 91 at a constant temperature to form a discotic nematic phase ($N_D$ phase), and curing the discotic nematic phase. The discotic liquid crystal 93 shows the minimum tilt angle (for example in the range of 0° to 15°) at the side of the support 91, and the maximum tilt angle (for example in the range of 20° to 60°) at the side of the air interface, i.e., at the opposite side. The alignment control direction 95 of the discotic liquid crystal 93 is parallel to the rubbing directions 16a and 22a of the alignment layers in the liquid crystal panel 60. More specifically, a WV film manufactured by Fujifilm Corporation can be used as the optical compensators 71 and 72.

The optical compensators 71 and 72 having the above structure are supported by the optical-axis-adjusting units 81 and 82, respectively, while being applied on a support substrate composed of alkali-free glass, sapphire, quartz crystal, or the like, and installed in the liquid crystal device 100. As shown in FIG. 5, each of the optical compensators 71 and 72 is disposed so as to have a predetermined distance from a surface of the liquid crystal panel 60. Thus, the optical compensators 71 and 72 are configured so as not to disturb the optical axis adjustment by the optical-axis-adjusting units 81 and 82, respectively. This structure in which the optical compensators 71 and 72 are far from the liquid crystal panel 60 is also advantageous in that heat accumulation between the liquid crystal panel 60 and each of the optical compensators can be minimized to suppress the degradation of the optical compensators.

In this embodiment, the optical-axis-adjusting units 81 and 82 for adjusting the installation angles of the optical compensators 71 and 72, respectively, with respect to the liquid crystal panel 60 are provided. Therefore, as shown in FIG. 6, by turning the optical compensator 71 around the rotation axis RA1, the installation angle $\theta_1$ of the optical compensator 71 with respect to the surface of the substrate of the liquid crystal panel 60 can be adjusted. Consequently, the optical compensator 71 can be easily disposed at a position where the phase retardation in the liquid crystal panel 60 can be satisfactorily compensated. Accordingly, a decrease in contrast due to light transmitting through the liquid crystal layer 50 in an oblique direction can be prevented to achieve a high-contrast display. In particular, in an optical compensator in which desired phase retardation is obtained by aligning liquid crystals in a WV film or the like, it is relatively difficult to control the alignment of the liquid crystals constituting the discotic compound layer 92. Therefore, the type of phase retardation is limited. In addition, even when such a film is merely applied at the side of the front face of the liquid crystal panel 60, desired operation of optical compensation cannot be achieved in many cases. According to this embodiment, however, even in such a case, substantial phase retardation of the optical compensator 71 with respect to the liquid crystal panel 60 can be adjusted by adjusting the installation angle $\theta_1$ of the optical compensator 71. Thus, optimization of optical compensation can be extremely easily performed. Furthermore, when the liquid crystal device 100 is used for a light valve of a projector and the optical system of the light valve, for example, the central axis of a lens or a light source is shifted from the central axis of the liquid crystal device 100, the compensation condition can be optimized by merely adjusting the angle of the optical compensators 71 and 72 without adjusting the light source, thus preventing a decrease in contrast.

In this embodiment, the optical compensator 71 can also be turned around the rotation axis RA2 by the optical-axis-adjusting unit 81. Thus, the position of the optical axis of the optical compensator 71 in the plane direction (the alignment control direction 95 of the discotic liquid crystal 93) with respect to the optical axis of the liquid crystal panel 60 (the rubbing direction 16a of the alignment layer 16) can be adjusted. Accordingly, even when the rubbing direction 16a is shifted from the predetermined direction during the process of producing the liquid crystal panel 60, the optical compensation can be extremely easily optimized by the above rotational operation. The optical compensator 72 disposed at the side of the front face of the liquid crystal panel 60 can also be turned around the rotation axes RA1 and RA2 by the optical-axis-adjusting unit 82. By, for example, adjusting the installation angle $\theta_2$ of the optical compensator 72 by these rotational operations, the optical compensator 72 can be easily disposed at a position that is optimum for optical compensation of the liquid crystal panel 60.

Accordingly, in the liquid crystal device 100 of this embodiment, the optical compensation of the OCB mode liquid crystal panel 60 can be easily optimized by the optical-axis-adjusting units 81 and 82 connected to the optical compensators 71 and 72, respectively, to obtain a high-contrast display.

Test Examples

Figure 7:
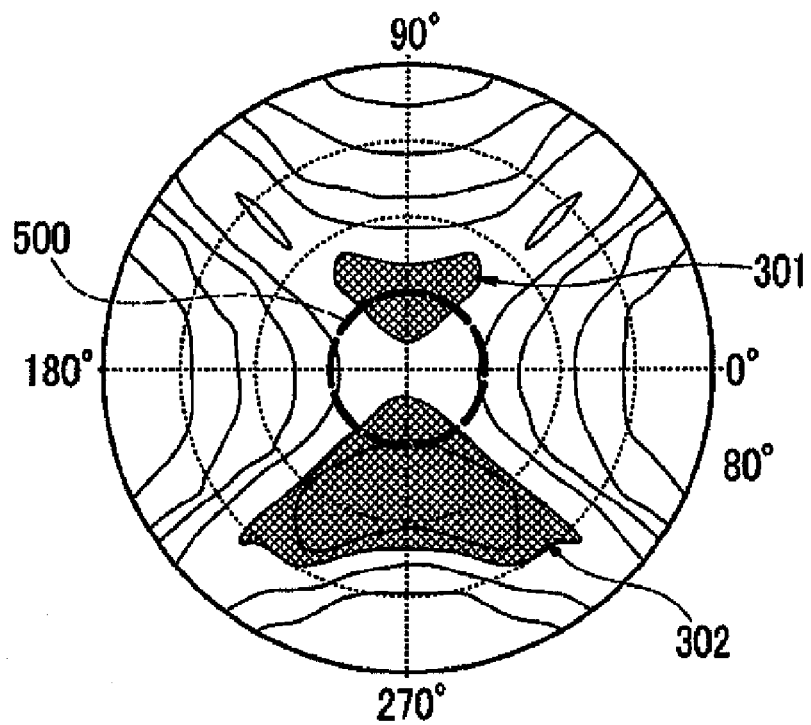
FIG. 7 is an equivalent contrast curve showing a test result according to the first embodiment of the invention.
Figure 8:
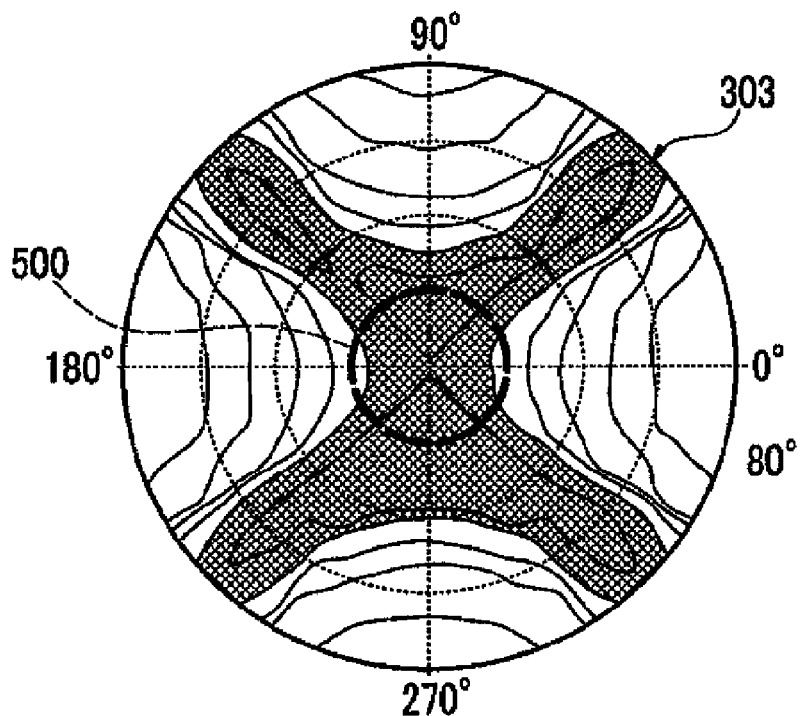
FIG. 8 is an equivalent contrast curve showing a test result according to the first embodiment of the invention.
Figure 9:
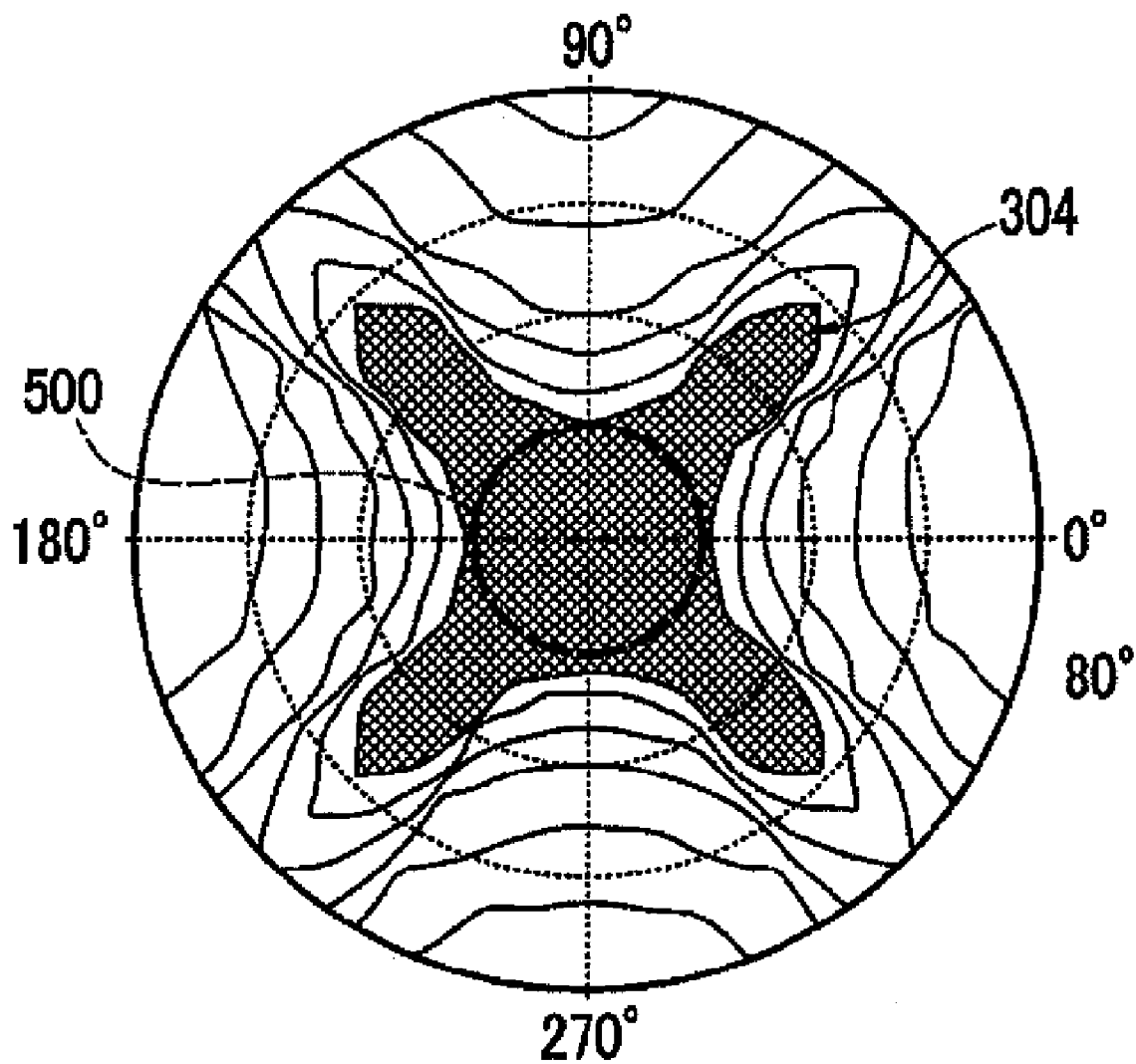
FIG. 9 is an equivalent contrast curve showing a test result according to the first embodiment of the invention.

FIGS. 7 to 9 show equivalent contrast curves in the case where the installation angle $\theta_1$ of the optical compensator 71 and the installation angle $\theta_2$ of the optical compensator 72 are changed in the liquid crystal device 100 of this embodiment. In FIG. 7, the installation angles $\theta_1$ and $\theta_2$ are 0°. In FIG. 8, the installation angles $\theta_1$ and $\theta_2$ are 2°. In FIG. 9, the installation angles $\theta_1$ and $\theta_2$ are 5°. Regarding the other conditions for the measurement, $\Delta n \times d$ of the liquid crystal panel 60 is 0.66 µm (in the state of splay alignment), the pretilt angle of the liquid crystal is 7°, the applied voltage for white display is 1.5 V, the applied voltage for black display is 5 V, and the front phase retardation of the optical compensators 71 and 72 (WV films) is 26 nm. Only the installation angles $\theta_1$ and $\theta_2$ are changed under the measurement conditions in each figure. In FIGS. 7 to 9, grid-patterned areas 301 to 304 disposed inside the equivalent contrast curves show a range of viewing angle in which the maximum contrast is obtained in each figure. A circular area 500 shows an area in which the viewing angle is 20° or less and which contributes to the contrast of the display in a projector having a light source distribution of a cone in the range of 10° to 20°.

Compared with FIGS. 7 to 9, under the condition in FIG. 7 in which each of the installation angles $\theta_1$ and $\theta_2$ is 0°, the areas 301 and 302 in which the maximum contrast is obtained are shifted from the center of the viewing angle in the vertical direction (in the directions of 90° and 270° in the figure), and the areas thereof are small. In contrast, under the conditions in FIGS. 8 and 9 in which each of the installation angles $\theta_1$ and $\theta_2$ is 2° and 5°, respectively, the areas 303 and 304 in which the maximum contrast is obtained are disposed at the center of the viewing angle, and the areas thereof are larger than the areas shown in FIG. 7. Among the conditions in FIGS. 8 and 9, under the condition in FIG. 9, the maximum contrast can be obtained in the entire range of the 20° cone that contributes to the display contrast of the projector. This result shows that the optimum compensation condition can be obtained when the liquid crystal device 100 is used as a light valve of the projector.

As described above, in this embodiment, the installation angles $\theta_1$ and $\theta_2$ of the optical compensators 71 and 72 can be adjusted by the optical-axis-adjusting units 81 and 82. Accordingly, an optical compensation condition for completely compensating for the phase retardation due to the pretilt of the liquid crystals in the liquid crystal panel 60 and the phase retardation due to light in an oblique direction can be extremely easily obtained to achieve a high-contrast display. Furthermore, even when a design change or the like occurs in the liquid crystal panel 60, the optical compensation condition can be adjusted without changing the optical compensators 71 and 72. This is advantageous in that the degree of freedom of the design can be increased and a high-quality display can be easily obtained. In this embodiment, the description has been made of the case where two optical compensators 71 and 72 are disposed so as to sandwich the liquid crystal panel 60. Alternatively, the number of the optical compensators may be one. Alternatively, both the optical compensators 71 and 72 may be disposed at the side of the front face (light-emitting side) of the liquid crystal panel 60. When the optical compensators 71 and 72 are disposed at the light-emitting side of the liquid crystal panel 60, degradation of the optical compensators 71 and 72 due to illuminating light can be prevented, thus producing a liquid crystal device having excellent reliability.

Second Embodiment

Figure 10:
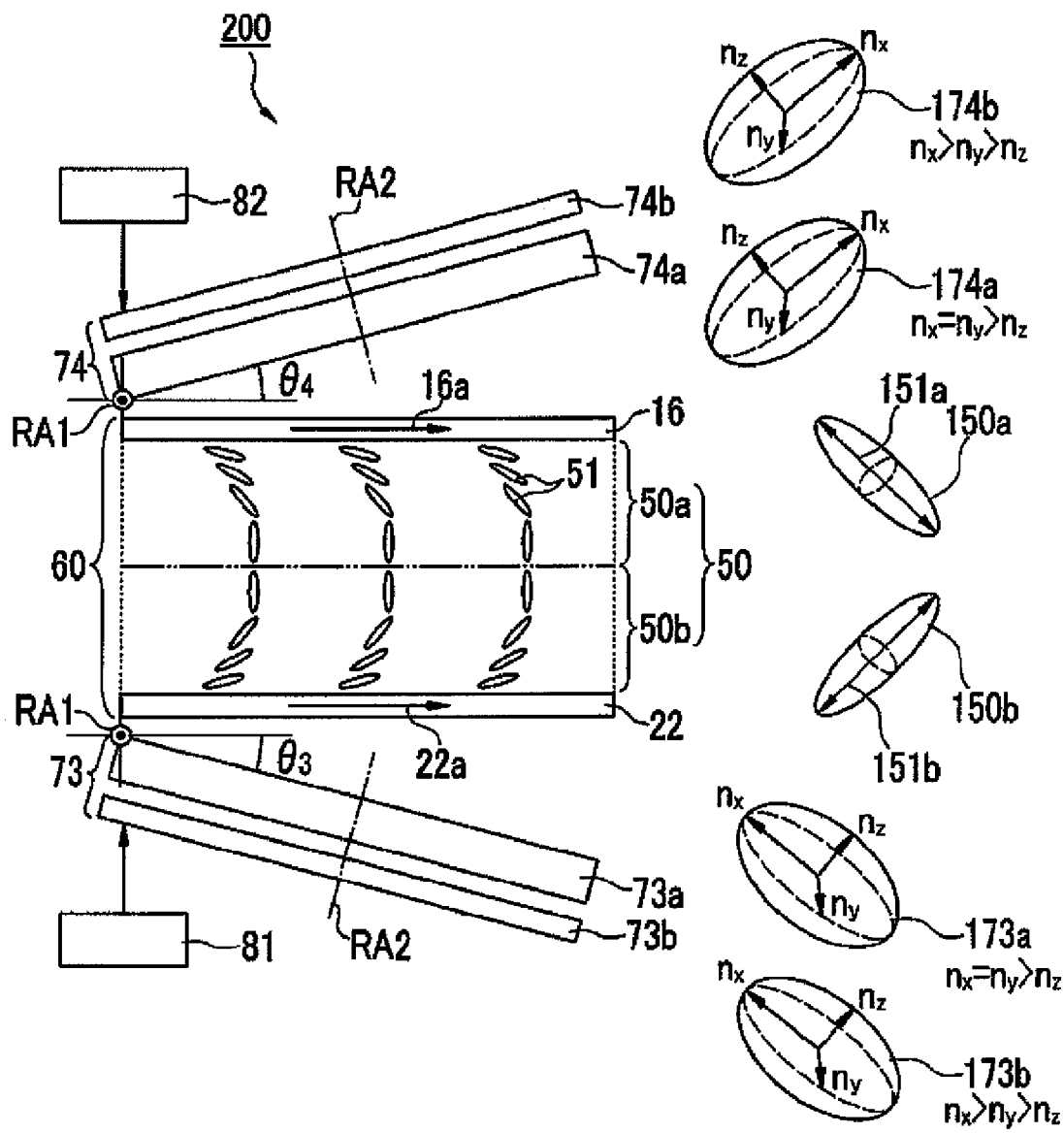
FIG. 10 is a schematic view illustrating the operation of optical compensation according to a second embodiment of the invention.

A liquid crystal device 200 of a second embodiment of the invention will now be described with reference to FIGS. 10 to 13. FIG. 10 is a view showing the schematic cross-sectional structure of the liquid crystal device 200 of this embodiment and corresponds to FIG. 6 in the first embodiment. In FIG. 10, the same constituent elements as those in the first embodiment are assigned the same reference numerals, and the description of those elements is omitted.

As shown in FIG. 10, the liquid crystal device 200 includes an optical compensator 73 disposed at the side of the back face (light-incident side) of a liquid crystal panel 60 and an optical compensator 74 disposed at the side of the front face (light-emitting side) of a liquid crystal panel 60. The optical compensator 73 is prepared by laminating two optical compensation films 73a and 73b. In this embodiment, the optical compensation film 73a is a negative C-plate (a uniaxial optical anisotropic medium that has negative refractive index anisotropy and that has the optical axis in the thickness direction) and the optical compensation film 73b is an optical anisotropic medium that exhibits a negative biaxial property (hereinafter referred to as "biaxial film").

Both the optical compensation films 73a and 73b have negative refractive index anisotropy, and their index ellipsoids 173a and 173b have a disc shape shown in FIG. 10. In the index ellipsoid 173a of the optical compensation film 73a, which is a C-plate, when the refractive index in the thickness direction is represented by nz and the refractive indices in the azimuth angle directions in the plane are represented by nx and ny, nx, ny, and nz satisfies a relationship nx=ny>nz. In the index ellipsoid 173b of the optical compensation film 73b, which is a biaxial film, nx, ny, and nz satisfies a relationship nx>ny>nz.

As in the optical compensator 73, in the optical compensator 74 disposed at the opposite side of the optical compensator 73 with respect to the liquid crystal panel 60, from the side of the liquid crystal panel 60, an optical compensation film 74a, which is a C-plate, and an optical compensation film 74b, which is a biaxial film, are laminated in that order. The layout of the optical compensation film 73a and the optical compensation film 73b, and the layout of the optical compensation film 74a and the optical compensation film 74b may be reverse.

When the optical axes in the z direction of the disc-shaped index ellipsoids 173a and 173b in the above optical compensation films 73a and 73b having optical anisotropy are disposed so as to be parallel with the optical axis 151b of the rugby ball-shaped index ellipsoid 150b disposed adjacent to the optical compensator 73, the optical plus and minus become opposite each other and the birefringence effect in the liquid crystal panel 60 can be cancelled out. Similarly, when the optical axes in the z direction of the optical compensation films 74a and 74b are disposed so as to be parallel with the optical axis 151a of the rugby ball-shaped index ellipsoid 150a disposed adjacent to the optical compensator 74, the optical plus and minus become opposite each other and the birefringence effect in the liquid crystal panel 60 can be cancelled out. Consequently, this structure can compensate for the optical phase retardation generated in an area at the light-incident side of the liquid crystal panel 60.

In the liquid crystal device 200 of this embodiment, optical-axis-adjusting units 81 and 82 are connected to the optical compensators 73 and 74, respectively, which are disposed so as to sandwich the liquid crystal panel 60. The installation angles of the optical compensators 73 and 74 with respect to the liquid crystal panel 60 can be adjusted as in the liquid crystal device 100 according to the first embodiment. More specifically, the optical-axis-adjusting unit 81 changes the installation angle $\theta_3$ by turning the optical compensator 73 around the rotation axis RA1, thereby adjusting the substantial phase retardation of the optical compensator 73 relative to light incident on the liquid crystal panel 60. In addition, by turning the optical compensator 73 around the rotation axis RA2, the positional relationship between the optical axis of the optical compensator 73 in the plane direction and the optical axis of the liquid crystal panel 60 in the plane direction can be adjusted. The optical-axis-adjusting unit 82 changes the installation angle $\theta_4$ by turning the optical compensator 74 around the rotation axis RA1, thereby adjusting the substantial phase retardation of the optical compensator 74 relative to the light emitting from the liquid crystal panel 60. In addition, by turning the optical compensator 74 around the rotation axis RA2, the positional relationship between the optical axis of the optical compensator 74 in the plane direction and the optical axis of the liquid crystal panel 60 in the plane direction can be adjusted.

Test Examples

Figure 11:
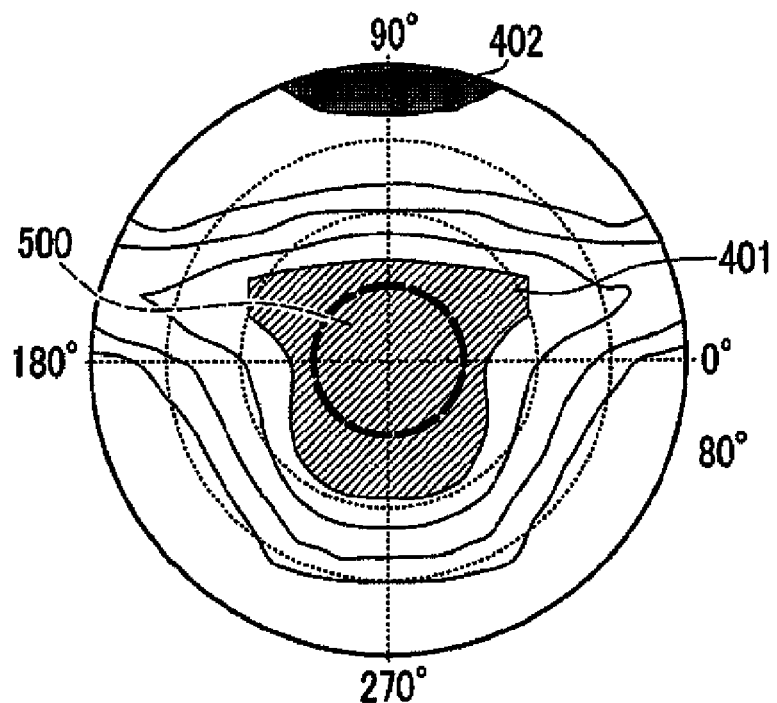
FIG. 11 is an equivalent contrast curve showing a test result according to the second embodiment of the invention.
Figure 12:
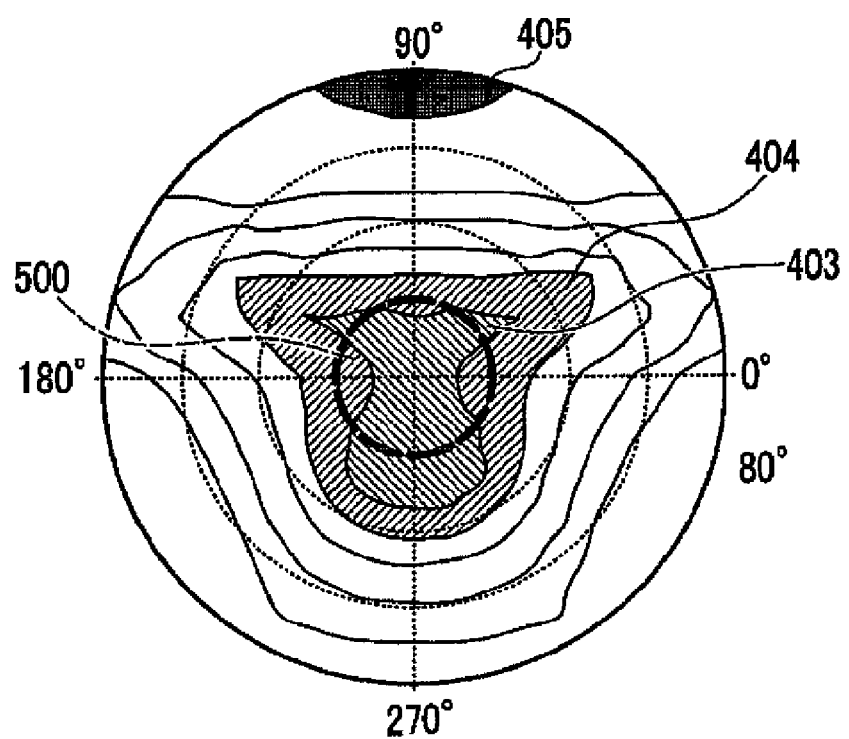
FIG. 12 is an equivalent contrast curve showing a test result according to the second embodiment of the invention.
Figure 13:
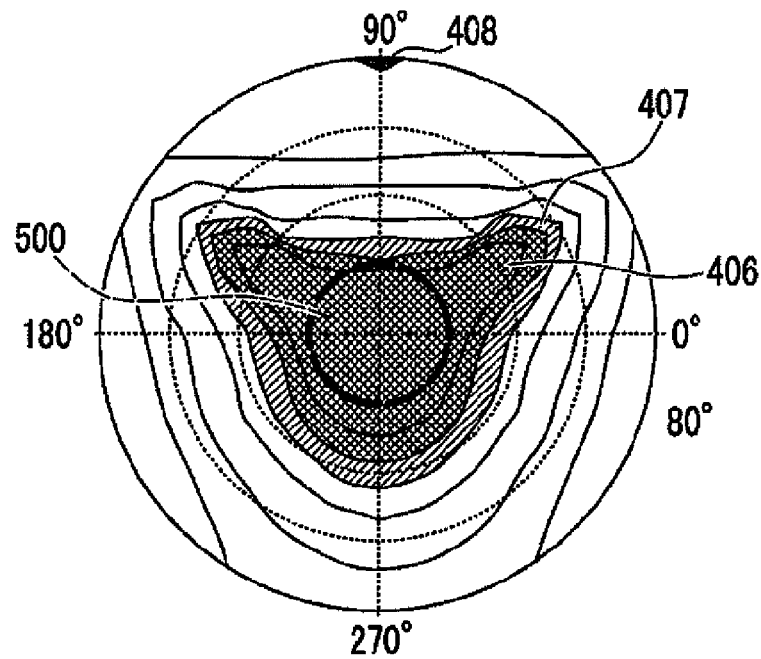
FIG. 13 is an equivalent contrast curve showing a test result according to the second embodiment of the invention.

FIGS. 11 to 13 show equivalent contrast curves in the case where the installation angle $\theta_3$ of the optical compensator 73 and the installation angle $\theta_4$ of the optical compensator 74 are changed in the liquid crystal device 200 of this embodiment. In FIG. 11, the installation angles $\theta_3$ and $\theta_4$ are 0°. In FIG. 12, the installation angles $\theta_3$ and $\theta_4$ are 5°. In FIG. 13, the installation angles $\theta_3$ and $\theta_4$ are 10°. Regarding the other conditions for the measurement, $\Delta n \times d$ of the liquid crystal panel 60 is 0.66 μm (in the state of splay alignment), the pretilt angle of the liquid crystal is 7°, the applied voltage for white display is 1.5 V, the applied voltage for black display is 5 V, the phase retardation of optical compensation films 73a and 74a (C-plates) in the thickness direction is 170 nm, the front phase retardation (in-plane phase retardation) of the optical compensation films 73b and 74b is 26 nm, and the phase retardation the optical compensation films 73b and 74b in the thickness direction is 26 nm. Only the installation angles $\theta_3$ and $\theta_4$ are changed under the measurement conditions in each figure. The front phase retardation is a value calculated by an expression (nx−ny)×d (wherein d represents a thickness of a film), and the phase retardation in the thickness direction is a value calculated by an expression ((nx+ny)/2+nz)×d.

In FIGS. 11 to 13, a circular area 500 shows an area in which the viewing angle is 20° or less and which contributes to the contrast of the display in a projector having a light source distribution of a cone in the range of 10° to 20°, as in the first embodiment. In the equivalent contrast curves shown in FIG. 11 to 13, since the maximums of the contrast are different from each other between different conditions, areas that provide the maximum contrast in each figure cannot be simply compared. In this embodiment, a grid-patterned area 406 shown inside the equivalent contrast curve of FIG. 13 is an area where the highest contrast was obtained among all conditions. An area 403 shown by the oblique lines rising leftward in FIG. 12 is an area where the second highest contrast was obtained. The contrast in an area 401 where the maximum contrast is obtained in FIG. 11 corresponds to that in an area 404 in FIG. 12 and an area 407 in FIG. 13, the areas being shown by the same oblique lines rising rightward as those in the area 401. Areas 402, 405, and 408 shown by the black area (minute grid-patterned area) in FIGS. 11, 12, and 13, respectively, are areas where the contrast is the lowest in FIGS. 11 to 13.

As is apparent from FIGS. 11 to 13, when the installation angles $\theta_3$ and $\theta_4$ are changed from 0° to 10°, the contrast is improved at the central part of the equivalent contrast curve. Under the condition in FIG. 13, wherein the maximum contrast is obtained, the maximum contrast is obtained in the entire range of the 20° cone that contributes to the display contrast of the projector. This result shows that the optimum compensation condition can be obtained when the liquid crystal device 200 is used as a light valve of the projector. In addition, as the installation angles $\theta_3$ and $\theta_4$ are increased, the areas 402, 405, and 408, which provide the lowest contrast, become small. Accordingly, when the liquid crystal device 200 is used for a direct-viewing-type liquid crystal device, the effect of improving the contrast can be achieved.

As described in detail above, according to the liquid crystal device 200 of this embodiment, the installation angles $\theta_3$ and $\theta_4$ of the optical compensators 73 and 74 can be adjusted by the optical-axis-adjusting units 81 and 82. Accordingly, an optical compensation condition for completely compensating for the phase retardation due to the pretilt of the liquid crystals in the liquid crystal panel 60 and the phase retardation due to light in an oblique direction can be extremely easily obtained to achieve a high-contrast display. In addition, when, for example, the rubbing direction of the alignment layer is varied during the production of the liquid crystal panel 60, the optical axes can be easily aligned by turning the optical compensators 73 and 74 around the rotation axis RA2. Furthermore, even when a design change or the like occurs in the liquid crystal panel 60, the optical compensation condition can be adjusted without changing the optical compensators 73 and 74. This is advantageous in that the degree of freedom of the design can be increased and a high-quality display can be easily obtained.

In this embodiment, the description has been made of the case where two optical compensators 73 and 74 are disposed so as to sandwich the liquid crystal panel 60. Alternatively, the number of the optical compensators may be one. Alternatively, both the optical compensators 73 and 74 may be disposed at the side of the front face (light-emitting side) of the liquid crystal panel 60. When the optical compensators 73 and 74 are disposed at the light-emitting side of the liquid crystal panel 60, degradation of the optical compensators 73 and 74 due to illuminating light can be prevented, thus producing a liquid crystal device having excellent reliability.

In the description of the second embodiment, the optical compensation films 73a and 74a having an optically uniaxial property (uniaxial films) are negative C-plates. Alternatively, the optical compensation films 73a and 74a may have an optically positive uniaxial property. In the second embodiment, the optical compensator 73 has a structure in which the optical compensation film 73a, which is a uniaxial film, and the optical compensation film 73b, which is a biaxial film, are laminated. Alternatively, the positions of the optical compensation film 73a and the optical compensation film 73b may be replaced with each other. Alternatively, only the biaxial film may be provided on one surface or both surfaces of the liquid crystal panel 60.

Third Embodiment

Figure 14:
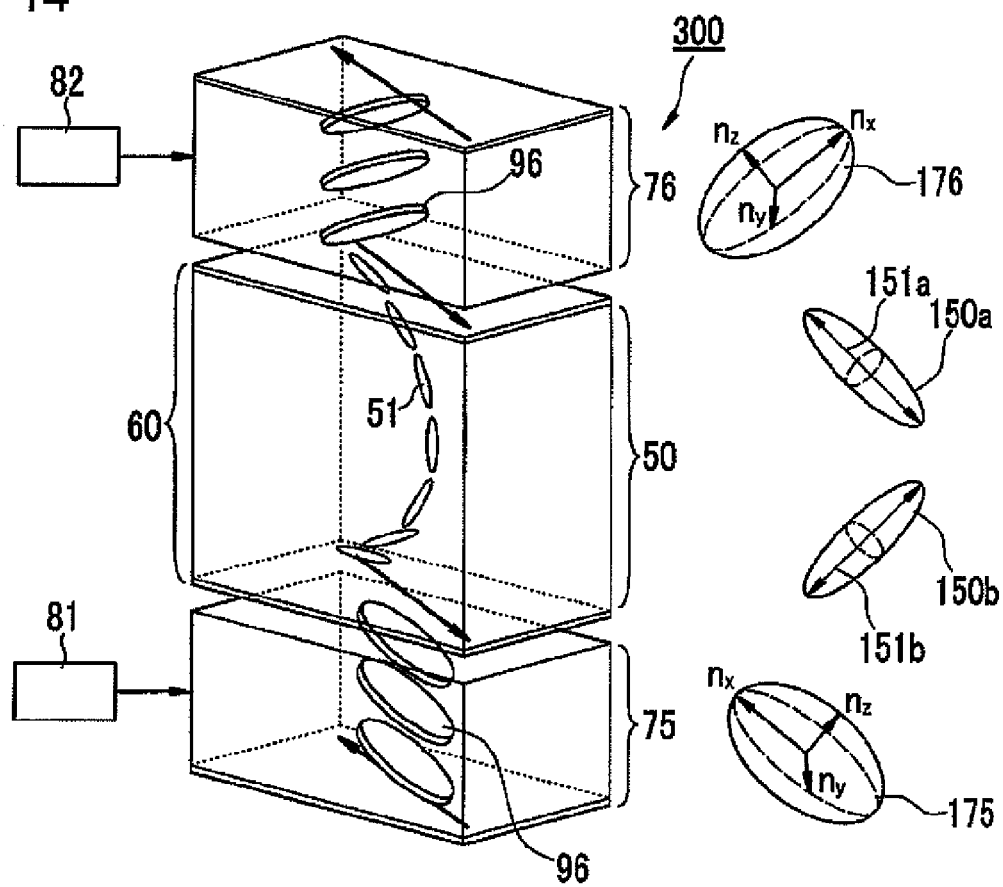
FIG. 14 is a schematic view illustrating the operation of optical compensation according to a third embodiment of the invention.

A third embodiment of the invention will now be described with reference to FIG. 14. FIG. 14 is a perspective view showing the schematic structure of a liquid crystal device 300 of this embodiment. In FIG. 14, the same constituent elements as those in the above embodiments are assigned the same reference numerals, and the description of those elements is omitted.

As shown in FIG. 14, the liquid crystal device 300 includes a liquid crystal panel 60 and two optical compensators 75 and 76 disposed so as to sandwich the liquid crystal panel 60. In this embodiment, the optical compensators 75 and 76 include an optical anisotropic layer composed of a discotic compound having negative refractive index anisotropy. Their index ellipsoids 175 and 176 are schematically shown on the right side of the optical compensators 75 and 76, respectively, in the figure.

The optical compensators 75 and 76 of this embodiment include an optical anisotropic substance composed of a discotic compound having negative refractive index anisotropy. The principal refractive indices nx, ny, and nz thereof satisfy a relationship nx=ny>nz. That is, the refractive index nz in the optical axis direction (thickness direction) is smaller than the refractive indices nx and ny in the other directions, and the index ellipsoid has a disc shape. This index ellipsoid is aligned so as to be slanted with respect to the horizontal plane of the optical compensators 75 and 76. Therefore, the optical axes of the optical compensators 75 and 76 are also slanted with respect to the directions of the normal lines of the substrates.

In the liquid crystal device 300 of this embodiment, optical-axis-adjusting units 81 and 82 are connected to the optical compensators 75 and 76, respectively. The installation angles ($\theta_1$ and $\theta_2$ shown in FIG. 6) of the optical compensators 75 and 76 with respect to the liquid crystal panel 60 can be adjusted by the optical-axis-adjusting units 81 and 82. Furthermore, by turning each of the optical compensators 75 and 76 in the plane direction, the optical axis in the plane direction can be adjusted. According to the liquid crystal device 300 having the above structure in this embodiment, by adjusting the installation angles of the optical compensators 75 and 76, the tilt angle of the optical axis of each of the optical compensators 75 and 76 in the thickness direction and the pretilt angle of the liquid crystal panel 60 can be easily aligned, and the optical axis of each of the optical compensators 75 and 76 in the plane direction and the rubbing direction of the corresponding alignment layer of the liquid crystal panel 60 can also be easily aligned. Therefore, according to the liquid crystal device 300 of this embodiment, the optical axis adjustment of each of the optical compensators 75 and 76 having an optical axis slanted with respect to a direction of the normal line of the substrate of the optical compensators and the liquid crystal panel 60 can be extremely easily performed to achieve a high-contrast display.

The optical compensators 75 and 76 used in this embodiment can be prepared by aligning discotic liquid crystals 96 in a tilted state, and then polymerizing the discotic liquid crystals 96. More specifically, the optical compensators 75 and 76 can be prepared by forming an alignment layer on a support composed of triacetyl cellulose (TAC) or the like, and then applying a discotic layer composed of a triphenylene derivative or the like on the alignment layer. A discotic compound exhibits an optically negative uniaxial property when it forms a liquid crystal phase. Accordingly, two supports each having an alignment layer composed of, for example, a polyimide thereon are prepared. The discotic compound is applied on one of the supports, and the discotic compound layer is then covered with another support. Subsequently, a discotic nematic ($N_D$) phase is formed by a heat treatment, and polymerization is conducted by irradiation of ultraviolet rays or the like to fix the alignment state. During the formation of the $N_D$ phase, a pretilt is formed in the discotic compound layer by the alignment layer provided on the support, and therefore the optical axis of the optical compensator is slanted. The tilt angles of the optical axis of the optical compensators 75 and 76 can be controlled by an alignment treatment (such as rubbing) of the alignment layer provided on the inner surface of the support.

Fourth Embodiment

Figure 15:
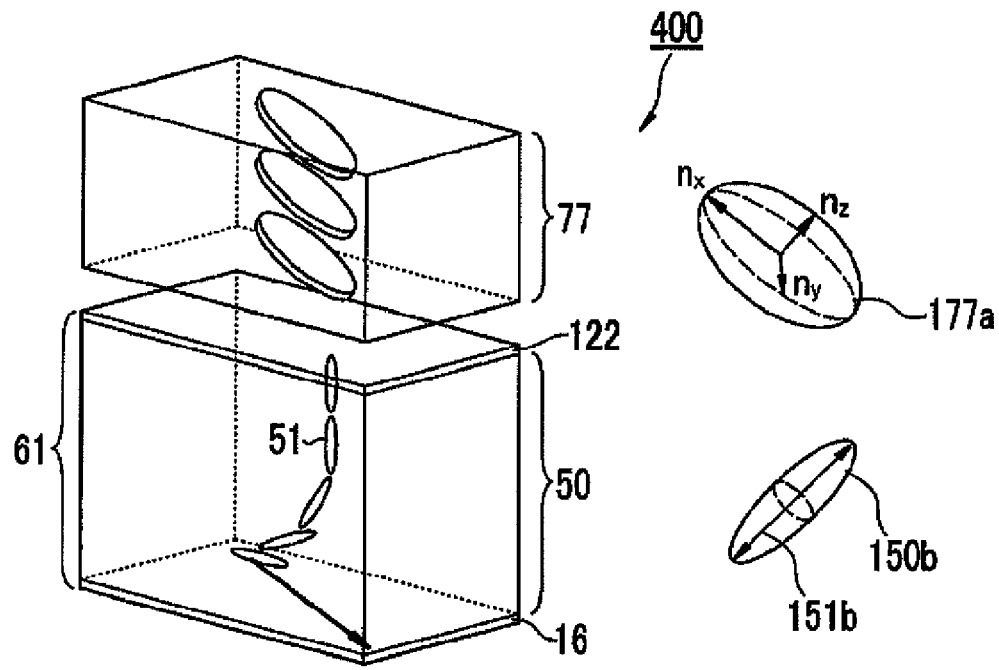
FIG. 15 is a schematic view illustrating the operation of optical compensation according to a fourth embodiment of the invention.
Figure 16:
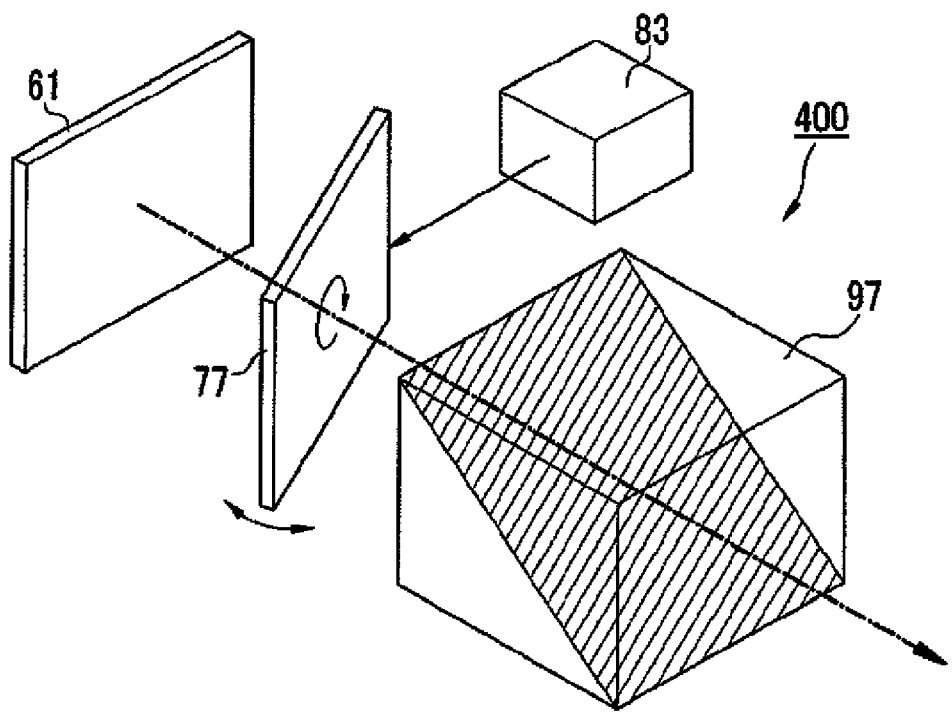
FIG. 16 is a schematic view showing the structure of a liquid crystal device according to the fourth embodiment of the invention.

In the above embodiments, liquid crystal devices including a transmissive liquid crystal panel have been described. However, the invention can also be suitably applied to a liquid crystal device including a reflective liquid crystal panel such as a liquid crystal on silicon (LCOS). FIG. 15 is a perspective view showing the schematic structure of a liquid crystal device 400 including a reflective liquid crystal panel 61 and an optical compensator 77 disposed adjacent to the front face of the reflective liquid crystal panel 61. FIG. 16 is a perspective view showing the positional relationship of the liquid crystal panel 61, the optical compensator 77, and a polarizing beam splitter 97 in the liquid crystal device 400.

As shown in FIG. 15, the liquid crystal panel 61 is a hybrid aligned nematic (HAN) mode liquid crystal panel including a reflective optically compensated bend (R-OCB) mode liquid crystal layer 50 in which liquid crystal molecules 51 have a hybrid alignment. In this liquid crystal panel 61, alignment layers 16 and 122 are provided so as to sandwich the liquid crystal layer 50. The alignment layer 16 is a homogeneous alignment layer in which an alignment treatment is performed in a predetermined direction, as in the alignment layer used in the liquid crystal device of the above-described embodiments. On the other hand, the alignment layer 122 is a homeotropic alignment layer that aligns the liquid crystal molecules 51 in a direction substantially perpendicular to the layer surface. As in the optical compensators 75 and 76 according to the third embodiment, the optical compensator 77 includes an optical anisotropic layer in which a discotic compound having a negative uniaxial property is aligned in a tilted state. In an index ellipsoid 177a thereof, the principal refractive indices nx, ny, and nz satisfy a relationship nx=ny>nz.

As shown in FIG. 16, in the liquid crystal device 400, the optical compensator 77 is disposed between the liquid crystal panel 61 and the polarizing beam splitter 97. An optical-axis-adjusting unit 83 having the same structure as that of the optical-axis-adjusting units 81 and 82 according to the first to third embodiments is connected to the optical compensator 77. The optical-axis-adjusting unit 83 can move the optical compensator 77 so that the optical compensator 77 is tilted with respect to the surface of the substrate of the liquid crystal panel 61 and turn the optical compensator 77 in the plane. The optical-axis-adjusting unit 83 can adjust the installation angle and the optical axis with respect to the liquid crystal panel 61 as in the above embodiments.

According to the liquid crystal device 400 having the above structure, the optical axis adjustment of the optical compensator 77 having an optical axis slanted with respect to the direction of the normal line of the substrate of the optical compensator and the liquid crystal panel 61 can be extremely easily performed to achieve a high-contrast display. When a sufficient distance between the liquid crystal panel 61 and the optical compensator 77 cannot be provided, the optical-axis-adjusting unit 83 may have only a mechanism for adjusting the optical axis in the plane of the liquid crystal panel and the optical axis in the plane of the optical compensator. In the description of this embodiment, the optical compensator 77 which has a negative uniaxial property and whose optical axis is slanted with respect to a direction of the normal line of the substrate of the optical compensator 77 is provided adjacent to the front face of the reflective liquid crystal panel 61. Alternatively, the same optical compensator as the optical compensators 71 to 74 used in the first embodiment and the second embodiment may be provided adjacent to the front face of the liquid crystal panel 61.

Projection Display Device

Figure 17:
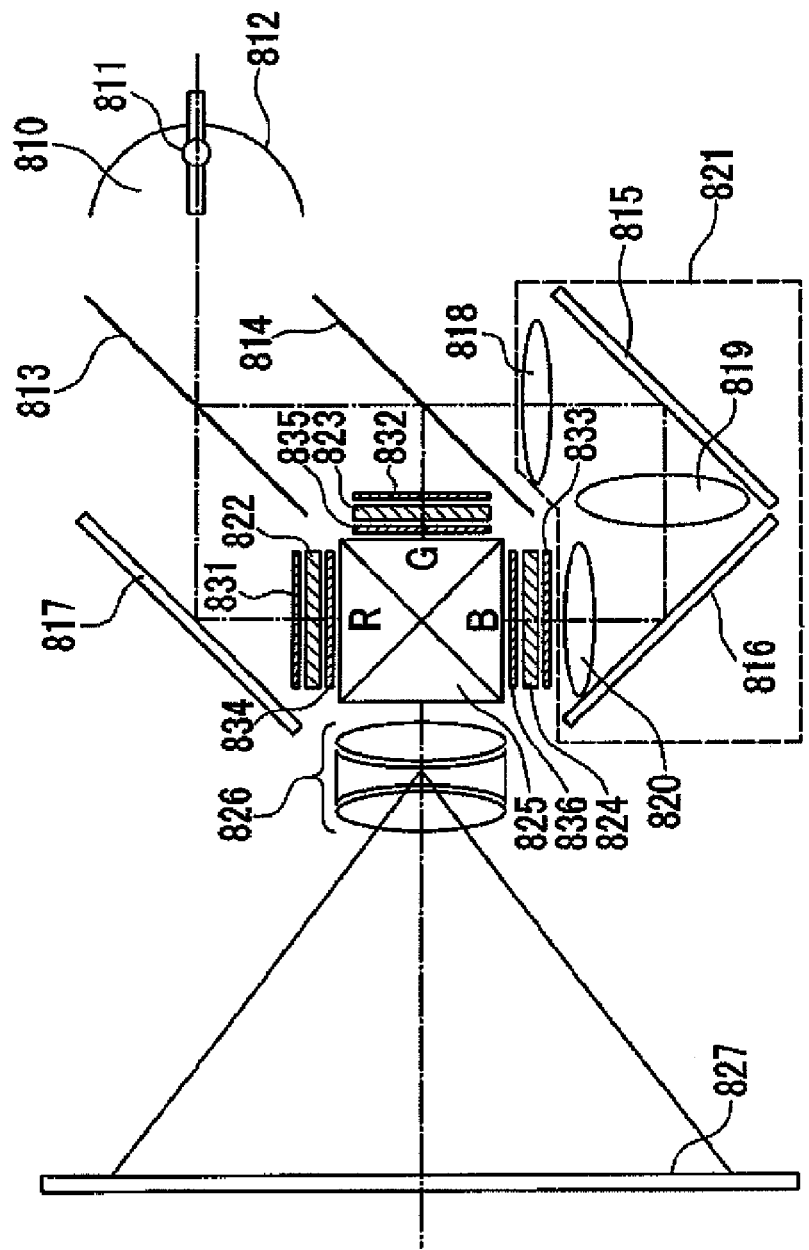
FIG. 17 is a schematic view showing the structure of an example of a projection display device.

A projection display device (projector) according to an embodiment of the invention will now be described with reference to FIG. 17. FIG. 17 is a schematic view showing the structure of the relevant part of a projector. This projector includes the liquid crystal devices according to the above embodiments as light modulation units.

The projector shown in FIG. 17 includes a light source 810, dichroic mirrors 813 and 814, reflecting mirrors 815, 816, and 817, an incident lens 818, a relay lens 819, an emission lens 820, light modulation units 822, 823, and 824 composed of liquid crystal devices of the invention, a cross dichroic prism 825, and a projection lens 826. The light source 810 includes a lamp 811 such as a metal halide lamp and a reflector 812 that reflects light from the lamp. Polarizing elements 831 to 836 are provided with the light modulation units 822, 823, and 824.

The dichroic mirror 813 transmits red light that is contained in white light from the light source 810 while reflecting blue light and green light. The transmitted red light is reflected by the reflecting mirror 817 and is incident on the light modulation unit for red light 822. The green light reflected by the dichroic mirror 813 is reflected by the dichroic mirror 814 and is incident on the light modulation unit for green light 823. The blue light reflected by the dichroic mirror 813 is transmitted through the dichroic mirror 814. A light-guiding unit 821 composed of a relay lens system including the incident lens 818, the relay lens 819, and the emission lens 820 is provided for the blue light in order to prevent light loss on a long optical path. The blue light passes through the light-guiding unit 821 and is incident on the light modulation unit for blue light 824.

The light of three colors modulated by the light modulation units 822, 823, and 824 is incident on the cross dichroic prism 825. The cross dichroic prism 825 is formed by joining four right-angle prisms, and a dielectric multilayer film that reflects red light and a dielectric multilayer film that reflects blue light are arranged in an X-shape at the interfaces between the prisms. These dielectric multilayer films combine the light components of three colors to generate light that expresses a color image. The combined light is projected onto a screen 827 by a projection optical system including the projection lens 826, and the image is enlarged for display.

The projector having the above structure includes the liquid crystal devices according to the first to third embodiments as the light modulation units. As described above, since this liquid crystal device can extremely easily optimize the optical axis adjustment, the projector of this embodiment easily achieves a high-contrast display.

The technical scope of the invention is not limited to the embodiments described above. Various modifications may be optionally added to the above-described embodiments without departing from the essence of the invention. For example, in the above embodiment, an example of a three-panel projection display device (projector) has been described, but the invention can also be applied to a single-plate projection display device or a direct-viewing-type display device. The liquid crystal device of the invention can also be applied to electronic apparatuses other than a projector. A specific example thereof is a cell phone. This cell phone includes the liquid crystal device according to any one of the above-described embodiments or a modification thereof in a display unit. Other examples of such electronic apparatuses include IC cards, video cameras, personal computers, head mount displays, facsimile machines equipped with a display function, a finder in a digital camera, portable televisions, digital signal processor (DSP) devices, personal digital assistants (PDAs), electronic notebooks, electric bulletin boards, and promotional displays.

The entire disclosure of Japanese Patent Application No. 2005-358553, filed Dec. 13, 2005 is expressly incorporated by reference herein.

What is claimed is:

1. A liquid crystal device, comprising:
    an Optically Compensated Bend mode liquid crystal panel including a pair of substrates and a liquid crystal layer disposed therebetween;
    a first alignment layer on one of the substrates;
    an optical compensator provided at one side of the liquid crystal panel to face said one of the substrates;
    a second alignment layer on said optical compensator; and
    an optical-axis-adjusting unit for moving the optical compensator relative to the liquid crystal panel to adjust an alignment control direction of the second alignment layer on the optical compensator to become substantially the same as an alignment control direction of the first alignment layer on said one of the substrates.

2. The liquid crystal device according to claim 1, wherein the optical compensator comprises discotic liquid crystal, and
    the optical-axis-adjusting unit is arranged for moving the optical compensator relative to the liquid crystal panel so that, among molecules of the discotic liquid crystal of the optical compensator, those with the largest tilt angle face the liquid crystal panel.

3. The liquid crystal device according to claim 2, wherein the discotic liquid crystal of the optical compensator is positioned between the first and second alignment layers.

4. The liquid crystal device according to claim 1, further comprising
    a third alignment layer on the other one of the substrates;
    a further optical compensator provided at an opposite side of the liquid crystal panel to face the other substrate;
    a fourth alignment layer on said further optical compensator; and
    a further optical-axis-adjusting unit for moving the further optical compensator relative to the liquid crystal panel to adjust an alignment control direction of the fourth alignment layer on the further optical compensator to become substantially the same as an alignment control direction of the third alignment layer on the other substrate.

5. The liquid crystal device according to claim 4, wherein the further optical compensator comprises discotic liquid crystal, and
    the further optical-axis-adjusting unit is arranged for moving the further optical compensator relative to the liquid crystal panel so that, among molecules of the discotic liquid crystal of the further optical compensator, those with the largest tilt angle face the liquid crystal panel.

6. The liquid crystal device according to claim 5, wherein the discotic liquid crystal of the further optical compensator is positioned between the third and fourth alignment layers.

* * * * *